(12) United States Patent
Pietromonaco

(10) Patent No.: US 10,056,858 B2
(45) Date of Patent: Aug. 21, 2018

(54) MOTOR DRIVER AND A METHOD OF OPERATING THEREOF

(71) Applicant: ARM Limited, Cambridge (GB)

(72) Inventor: David Victor Pietromonaco, Cupertino, CA (US)

(73) Assignee: ARM Limited, Cambridge (GB)

( * ) Notice: Subject to any disclaimer, the term of this patent is extended or adjusted under 35 U.S.C. 154(b) by 17 days.

(21) Appl. No.: 15/424,008

(22) Filed: Feb. 3, 2017

(65) Prior Publication Data

US 2017/0149368 A1    May 25, 2017

Related U.S. Application Data

(63) Continuation-in-part of application No. 15/209,790, filed on Jul. 14, 2016, now Pat. No. 9,954,474, which
(Continued)

(51) Int. Cl.
*H02P 25/092* (2016.01)
*H02M 3/158* (2006.01)
(Continued)

(52) U.S. Cl.
CPC .......... *H02P 25/092* (2016.02); *B60L 11/005* (2013.01); *H02K 11/22* (2016.01);
(Continued)

(58) Field of Classification Search
CPC .............................. H02P 25/0092; H02K 1/24
(Continued)

(56) References Cited

U.S. PATENT DOCUMENTS

| 3,697,839 A | 10/1972 | Unnewehr |
| 5,272,401 A | 12/1993 | Lin |

(Continued)

FOREIGN PATENT DOCUMENTS

| EP | 0 441 970 | 8/1991 |
| EP | 1 039 625 | 9/2000 |

(Continued)

OTHER PUBLICATIONS

Office Action dated Aug. 3, 2017 in co-pending U.S. Appl. No. 15/209,790, 7 pages.

(Continued)

*Primary Examiner* — David S Luo
(74) *Attorney, Agent, or Firm* — Nixon & Vanderhye P.C.

(57) ABSTRACT

Apparatus is provided comprising an electrical motor comprising a rotor and a stator, the rotor comprising a plurality of rotor teeth and the stator comprising a plurality of stator teeth. The apparatus has a driver circuit to drive the electrical motor comprising a boost converter comprising a charge storage element and coupled to a first terminal of a coil winding on at least one of the plurality of stator teeth, and a buck converter comprising the same charge storage element and coupled to the same first terminal of the coil winding on the at least one of the plurality of stator teeth. An inductive element of the boost converter and the buck converter is provided by the coil winding of the at least one of the plurality of stator teeth, and the charge storage element is referenced to a supply node for coupling the second terminal of the coil winding to an electrical supply.

18 Claims, 25 Drawing Sheets

Related U.S. Application Data is a continuation of application No. 14/488,666, filed on Sep. 17, 2014, now Pat. No. 9,419,551.

(51) Int. Cl.
| | |
|---|---|
| *B60L 11/00* | (2006.01) |
| *H02M 3/155* | (2006.01) |
| *H02P 25/08* | (2016.01) |
| *H02K 11/22* | (2016.01) |
| *H02M 1/00* | (2006.01) |

(52) U.S. Cl.
CPC ........... *H02M 3/155* (2013.01); *H02M 3/158* (2013.01); *H02M 3/1582* (2013.01); *H02M 3/1584* (2013.01); *H02P 25/08* (2013.01); *B60L 2220/54* (2013.01); *H02M 2001/0064* (2013.01); *H02M 2003/1552* (2013.01); *H02M 2003/1586* (2013.01); *H02P 2201/07* (2013.01); *H02P 2201/09* (2013.01); *Y02T 10/641* (2013.01); *Y02T 10/642* (2013.01)

(58) Field of Classification Search
USPC .............................. 318/400.3, 400.01, 700
See application file for complete search history.

(56) References Cited

U.S. PATENT DOCUMENTS

| | | | |
|---|---|---|---|
| 5,633,568 A | 5/1997 | Dunfield | |
| 5,889,922 A | 3/1999 | Bufe | |
| 5,923,142 A | 7/1999 | Li | |
| 6,057,622 A * | 5/2000 | Hsu ..................... | H02K 21/046 |
| | | | 310/155 |
| 6,078,161 A | 6/2000 | Kim | |
| 6,339,310 B1 | 1/2002 | Sugiyama | |
| 7,719,147 B2 | 5/2010 | Palmer, Jr. | |
| 8,264,177 B2 | 9/2012 | Palmer | |
| 9,419,551 B2 | 8/2016 | Pietromonaco | |
| 2004/0085040 A1 | 5/2004 | Chen | |
| 2005/0072608 A1 | 4/2005 | Johnston | |
| 2005/0116679 A1 | 6/2005 | Ramu | |
| 2007/0031131 A1 | 2/2007 | Griffitts | |
| 2009/0146598 A1 | 6/2009 | Hayashi | |
| 2010/0123426 A1 | 5/2010 | Nashiki | |
| 2011/0181135 A1 | 7/2011 | Pollock | |
| 2013/0076292 A1 | 3/2013 | Okada et al. | |
| 2013/0257188 A1 | 10/2013 | Raminosoa | |
| 2014/0139154 A1 | 5/2014 | Chuang | |
| 2016/0079893 A1 | 3/2016 | Pietromonaco | |

FOREIGN PATENT DOCUMENTS

| | | |
|---|---|---|
| EP | 2 372 894 | 10/2011 |
| EP | 2 765 022 | 8/2014 |
| WO | WO 2013/105506 | 7/2013 |

OTHER PUBLICATIONS

Notice of Allowance dated Dec. 21, 2017 in co-pending U.S. Appl. No. 15/209,790, 9 pages.
U.S. Appl. No. 15/209,790, filed Jul. 14, 2016, Pietromonaco.
U.S. Appl. No. 14/488,679, filed Sep. 17, 2014, Pietromonaco.
International Search Report and Written Opinion of the International Searching Authority dated Nov. 18, 2015 in PCT/GB2015/052589, 11 pages.
Office Action dated Dec. 22, 2015 in co-pending U.S. Appl. No. 14/488,679, 24 pages.
V.V. Deshpande et al, "New Converter Configurations for Switched Reluctance Motors Wherein Some Windings Operate on Recovered Energy" *IEEE Transactions on Industry Applications*, vol. 38, No. 6, Nov./Dec. 2002, pp. 1558-1565.
International Search Report and Written Opinion of the International Searching Authority dated Jan. 15, 2016 in PCT/GB2015/052590, 14 pages.
International Search Report and Written Opinion of the International Searching Authority dated May 4, 2018 in PCT/GB2018/050313, 16 pages.
D. Pietromonaco et al, "An Inexpensive Constant Efficiency SRM System" 2016 19$^{th}$ International Conference on Electrical Machines and Systems (ICEMS), Nov. 13, 2016, 4 pages.

\* cited by examiner

OFFICIAL SENSOR OUTPUT:

| 1 | 2 | 3 |
|---|---|---|
| ON | OFF | OFF |
| ON | ON | OFF |
| OFF | ON | OFF |
| OFF | ON | ON |
| OFF | OFF | ON |
| ON | OFF | ON |

MOTOR DRIVER AND A METHOD OF OPERATING THEREOF

CROSS-REFERENCE

This application is a continuation-in-part of U.S. application Ser. No. 15/209,790 filed Jul. 14, 2016, which itself is a continuation of U.S. application Ser. No. 14/488,666 filed Sep. 17, 2014, the entire contents of both previous applications being incorporated herein by reference in this application.

TECHNICAL FIELD

The present disclosure relates to electrical motors. More particularly, this disclosure relates to coil driver circuitry for an electrical motor.

BACKGROUND

In an electrical motor which has coil windings as part of its stator, such as in a switched reluctance electrical motor, it is common for the electrical motor to be powered by a three phase power supply and to apply AC waveforms to the coil windings to control the operation of the motor. Some electric motors have been created with more phases, but a significant factor in creating such multi-phase electrical motors is the cost of the phase driver electronics. In conventional motors a pulse width modulation (PWM) voltage controller (typically arranged with an H-bridge topology to drive motor coils bi-directionally) is coupled to a large power supply and the large voltages and currents which are required to drive the motor coils can add significantly to the cost of the driver circuitry. Accordingly, multiple phase motors requiring multiple coil driver circuits are expensive to produce according to contemporary techniques.

Also conventional motors usually only operate at their highest efficiency when operating at full design output power levels. It is known to provide variable output driver circuits to allow a motor to operate at reduced output power levels, but the motor efficiency is then markedly reduced due to a less effective coupling of the smaller magnetic fields. Consequently, to maintain reasonable efficiency such motors must be operated in narrow ranges near their design points, and mechanical gearboxes and transmission systems (even some with multiple motors) must be used to maintain efficiency across a wider range of output levels. Such configurations are both expensive and mechanically complex.

SUMMARY

At least one example described herein provides apparatus comprising:
an electrical motor comprising a rotor and a stator, the rotor comprising a plurality of rotor teeth and the stator comprising a plurality of stator teeth, and
a driver circuit to drive the electrical motor comprising:
a boost converter comprising a charge storage element and coupled to a first terminal of a coil winding on at least one of the plurality of stator teeth; and
a buck convener comprising said charge storage element and coupled to said first terminal of the coil winding on the at least one of the plurality of stator teeth,
wherein an inductive element of the boost converter and the buck converter is provided by said coil winding of the at least one of the plurality of stator teeth,
and wherein the charge storage element is referenced to a supply node for coupling the second terminal of the coil winding to an electrical supply.

At least one example described herein provides a motor driver circuit for driving a coil winding of an electrical motor comprising:
a boost converter comprising a charge storage element and an input node arranged to be coupled to a first terminal of a coil winding of an electrical motor; and
a buck convener comprising said charge storage element and said input node,
wherein an inductance of the boost converter and the buck convener is provided when the input node is coupled to the coil winding of the electrical motor,
wherein an output of the boost converter is a voltage developed across the charge storage element and an input of the buck converter is the voltage developed across the charge storage element,
and wherein the charge storage element is referenced to a supply node, wherein the supply node is arranged to couple the second terminal of the coil winding to an electrical supply.

At least one example described herein provides a method of operating a driver circuit to drive an electrical motor comprising:
switching a boost converter comprising a charge storage element and coupled to a first terminal of a coil winding on at least one of the plurality of stator teeth of the electrical motor to connect the first terminal of the coil winding to a ground node of an electrical supply, wherein a supply node of the electrical supply is coupled to a second terminal of the coil winding;
switching a buck converter comprising said charge storage element and coupled to said first terminal of the coil winding to connect the first terminal of the coil winding to the charge storage element, wherein an inductive element of the boost converter and the buck converter is provided by said coil winding of the at least one of the plurality of stator teeth;
and referencing the charge storage element to the supply node.

BRIEF DESCRIPTION OF THE DRAWINGS

The present invention will be described further, by way of example only, with reference to particular examples as illustrated in the accompanying drawings, in which.

DESCRIPTION OF EXAMPLE EMBODIMENTS

Figure 1:
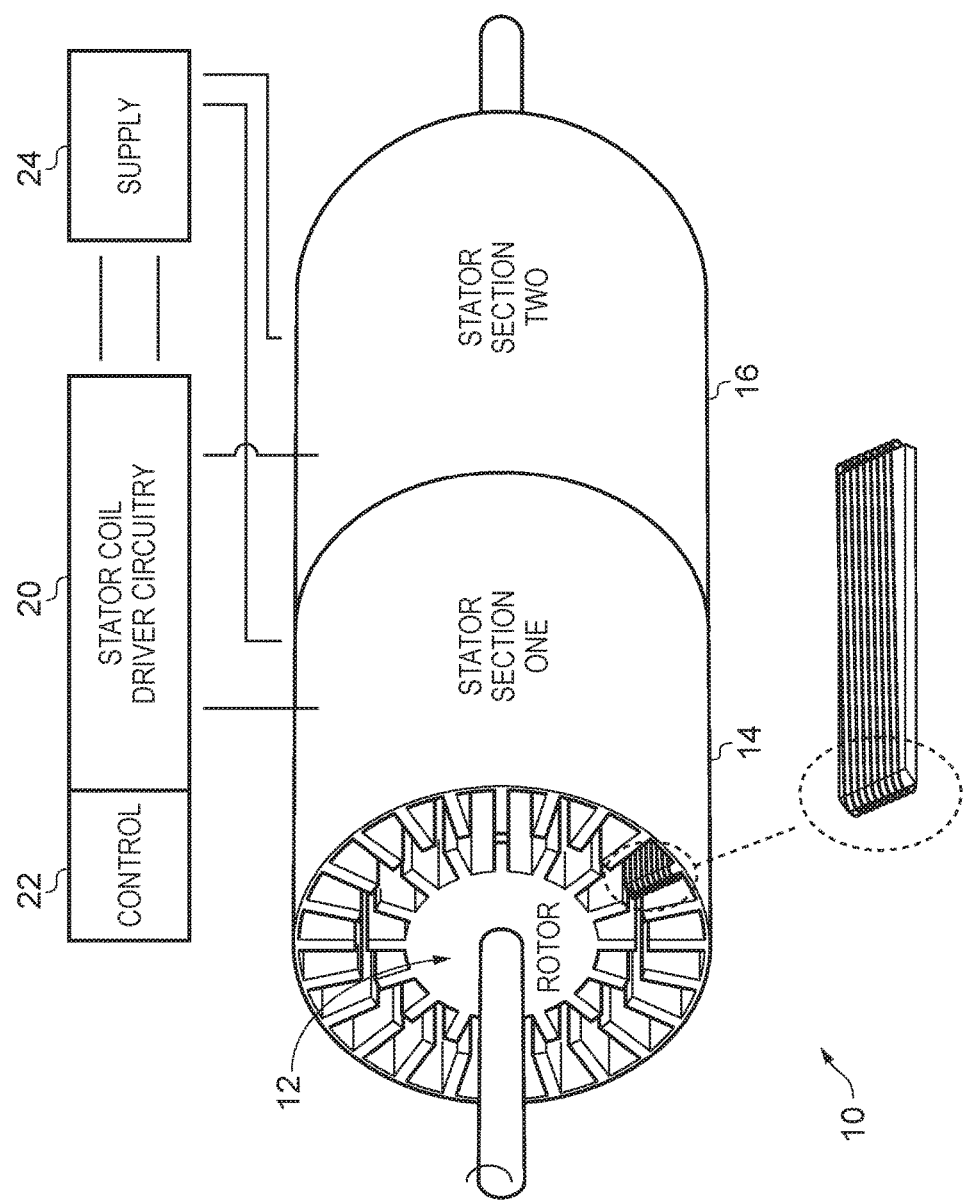
FIG. 1 schematically illustrates a switched reluctance motor having two stator sections in one example.

In some examples there is apparatus comprising:

an electrical motor comprising a rotor and a stator, the rotor comprising a plurality of rotor teeth and the stator comprising a plurality of stator teeth, and a driver circuit to drive the electrical motor comprising:

a boost converter comprising a charge storage element and coupled to a first terminal of a coil winding on at least one of the plurality of stator teeth; and a buck converter comprising said charge storage element and coupled to said first terminal of the coil winding on the at least one of the plurality of stator teeth, wherein an inductive element of the boost converter and the buck converter is provided by said coil winding of the at least one of the plurality of stator teeth, and wherein the charge storage element is referenced to a supply node for coupling the second terminal of the coil winding to an electrical supply.

As is described in more detail below, the techniques discussed herein provide a configuration of combined switched inductance boost voltage converter circuitry and switched inductance buck voltage converter circuitry within a driver circuit for an electric motor coil. In this context whilst a more conventional expectation might be for the charge storage element to be referenced to a ground node in the circuitry, a further alternative configuration has been established which references the charge storage element to a supply node. In the operation of the driver circuitry, which may be characterized by having a "boost phase" and a "buck phase", it has been found that some configurations of the driver circuit can be improved by this arrangement because it cuts the electrical supply out of the buck phase and the buck phase recharges itself. Because the inductive element is attached to the supply node, not the ground node, and here the charge storage element is also attached to the supply node, not the ground node, the entire buck phase dumps charge in a tight loop between the charge storage element and the inductive element, and the electrical supply is no longer involved. Hence when the inductive element is charged from the charge storage element in the buck phase, the current no longer flows to the supply and then the inductive element is discharged in the buck phase, the charge flows back to the charge storage element from where it came.

This also allows for a reduction in size (and thus notably also cost) of the charge storage element, since the charge storage element is always biased at the supply voltage. As mentioned above, this supply referencing of the charge storage element means that the supply does not take part in any current that involves the charge storage element, since the supply is bypassed whenever the charge storage element is charging or discharging, allowing it to be reduced in size. Unlike in the case of a ground-referenced charge storage element, the inductive element current does not match the supply current. It is recognized that this arrangement may have other consequences, for example this may obstruct bi-directional operation (used for example in energy recovering braking), but this is not a key feature of all motor applications (e.g. those provided for pumps and blowers)

In some examples the apparatus further comprises a supply diode coupling in a forward direction the supply node to the second terminal of the coil winding. Such a supply diode, which may for example take the form of a true diode or may also say be provided by a transistor arranged as a switch, placed inline from the supply can hinder current from flowing back to the supply. In such examples, when the driver circuit tries to drive current back to the supply (which only happened on buck inductor discharge), voltage then builds up at a node "downstream" of the supply diode (also referred to herein as the "local supply" node). Regeneration may also be prevented. As the voltage at this local supply increases, some of the current will be driven back towards the charge storage element, partly recharging it.

Electrical energy which remains stored at the local supply may in some configurations have the potential to result in relatively high local voltages and accordingly in some examples the apparatus further comprises a supply capacitor spanning the supply diode. Such a supply capacitor can absorb this additional local current and reduce the level of such local supply voltages. In a similar, alternative configuration in some examples the apparatus further comprises a supply capacitor coupling the second terminal of the coil winding to a ground node on an opposite side of the electrical supply to the supply node.

As mentioned above, depending on the particular configuration, and notably the provision or not of additional protective diodes, in some examples the electrical supply is a bidirectional electrical supply. In other examples the electrical supply is a unidirectional electrical supply.

In some examples the apparatus comprises two further driver circuits to drive the electrical motor, wherein the driver circuit and the two further driver circuits are coupled to three independent coil windings of the electrical motor, wherein the driver circuit and the two further driver circuits share the electrical supply, and wherein the driver circuit and the two further driver circuits are arranged to operate in a three-phase arrangement with respect to one another. In such a three-phase arrangement the referencing of the charge storage element to a supply node in the circuitry can result in approximately half the supply current being drawn and the respective charge storage elements only needing to he approximately half the size (by comparison with an equivalent ground node referenced arrangement).

In some examples the boost converter further comprises: a diode coupled to the coil winding and a first electrode of the charge storage element; and a switch arranged to connect the coil winding to a ground node on an Opposite side of the electrical supply to the supply node. Essentially therefore such examples provide two key components of the switched inductance boost voltage converter circuitry in the form of a boost diode and a boost switch.

In some examples the buck converter further comprises: a diode coupled to the coil winding and the ground node on the opposite side of the electrical supply to the supply node; and a switch arranged to connect the coil winding to the first electrode of the charge storage element in dependence on a buck signal. Similarly to the boost arrangement described in the previous paragraph, such examples therefore provide two key components of the switched inductance buck voltage converter circuitry in the form of a buck diode and a buck switch.

In some examples there is a motor driver circuit for driving a coil winding of an electrical motor comprising:
a boost converter comprising a charge storage element and an input node arranged to be coupled to a first terminal of a coil winding of an electrical motor; and
a buck converter comprising said charge storage element and said input node,
wherein an inductance of the boost converter and the buck converter is provided when the input node is coupled to the coil winding of the electrical motor,
wherein an output of the boost converter is a voltage developed across the charge storage element and an input of the buck converter is the voltage developed across the charge storage element,
and wherein the charge storage element is referenced to a supply node, wherein the supply node is arranged to couple the second terminal of the coil winding to an electrical supply.

In some examples there is a method of operating a driver circuit to drive an electrical motor comprising:
switching a boost converter comprising a charge storage element and coupled to a first terminal of a coil winding on at least one of the plurality of stator teeth of the electrical motor to connect the first terminal of the coil winding to a ground node of an electrical supply, wherein a supply node of the electrical supply is coupled to a second terminal of the coil winding;
switching a buck converter comprising said charge storage element and coupled to said first terminal of the coil winding to connect the first terminal of the coil winding to the charge storage element, wherein an inductive element of the boost converter and the buck converter is provided by said coil winding of the at least one of the plurality of stator teeth;
and referencing the charge storage element to the supply node.

In some examples a driver circuit is provided for driving an electrical motor coil comprising: switched inductance boost voltage converter circuitry comprising a storage capacitor and an input node arranged to be coupled to the electrical motor coil; and switched inductance buck voltage converter circuitry comprising the input node and the storage capacitor, wherein inductance of the switched inductance boost voltage converter circuitry and of the switched inductance buck voltage converter circuitry is provided when the input node is coupled to the electrical motor coil, and an output of the switched inductance boost voltage converter circuitry is a voltage developed across the storage capacitor and an input of the switched inductance buck voltage converter circuitry is the voltage developed across the storage capacitor.

Whilst switched inductance boost voltage converter circuitry and switched inductance buck voltage converter circuitry are each individually known, the driver circuit of the present techniques adapts and combines the two in a particular manner. Firstly a storage capacitor is provided where the output of the boost voltage converter would typically be and secondly the output of the boost voltage converter provides the input for the buck voltage converter. Indeed, the storage capacitor which forms part of the switched inductance boost voltage converter circuitry also forms part of the switched inductance buck voltage converter circuitry, such that the voltage developed across the storage capacitor by the boost voltage converter circuitry is configured to provide the input for the buck voltage converter circuitry.

The inventor has surprisingly found that such a configuration of combined switched inductance boost voltage converter circuitry and switched inductance buck voltage converter circuitry can be of particular benefit in the context of a driver circuit for an electric motor coil. The electrical motor coil provides the switched inductance element in both the boost voltage converter circuitry and the buck voltage converter circuitry, and combining the circuits in this way allows the switching current to flow in one direction through the electrical motor coil when the boost voltage converter circuitry dominates and in the opposite direction through the electrical motor coil when the buck voltage converter circuitry dominates.

This arrangement has various advantages. If the inductance of the electrical motor coil is large, a large voltage will be required to change the current flow. The rate of current change is given by the voltage divided by the inductance ($di/dt=V/L$), and hence it is generally required when powering an electrical motor coil having a large inductance to provide a high voltage in order both to start current flow quickly and to stop current flow quickly. However, according to the present arrangement, because the circuit creates its own high voltage through the action of its boost voltage converter circuitry, a high voltage need only be provided initially to start a current flow and a self-boosting voltage is used to stop it. Accordingly, to a first approximation only half the supply voltage of a normal (prior art) driver circuit is required. For example, in a configuration with a 150V supply and a 35 mH electrical motor coil, that supply voltage can be applied to the coil to start it conducting. When the voltage is removed from the coil, the current will continue to flow as the energy is dissipated from the coil. Using the driver circuit this energy dissipated from the coil is collected in a storage capacitor. Continuing the above example this quickly boosts the storage capacitor to approximately 300V and the resulting −150V difference quickly shuts down the current in the coil. Furthermore, the boosted voltage stored in the storage capacitor is then available for energizing the coil in the opposite direction. The operation of the buck voltage converter circuitry can then apply the previously boosted voltage to the electrical motor coil, and drive the current back towards the original power supply. Further continuing the above example, the approximately 300V now gives 150V differential to the 150V power supply, and quickly drives up the current in the coil. To shut it down, the approximately 300V is removed and a ground connection applied. Hence the coil then sees −150V and quickly shuts down.

Further, the arrangement of the present driver circuit to have combined switched inductance boost and buck voltage converter circuitry means that this driver circuit does not act as a pulse width modulation (PWM) controller (as many prior art driver circuits do) and as such the switching which it performs can take place when the currents flowing and switching voltages are low, making the power dissipation in the driver circuit small. A particular consequence of this is for the components which make up the driver circuit, which can thus be provided by circuit components with relatively low ratings and tolerances, contributing to the overall lower cost of the present driver circuit.

In some examples of the driver circuit the switched inductance boost voltage converter circuitry comprises a boost diode connecting in a forward direction the input node and a first electrode of the storage capacitor; and a boost switch arranged to connect the input node to a second electrode of the storage capacitor in dependence on a boost signal, and the switched inductance buck voltage converter circuitry comprises a buck diode connecting in a forward direction the second electrode of the storage capacitor to the input node; and a buck switch arranged to connect the input node to the first electrode of the storage capacitor in dependence on a buck signal. The symmetry of this arrangement provides a balanced arrangement supporting the bidirectional characteristic of the driver circuit in which control over the coupling of the storage capacitor to the electrical motor coil in each direction (via the input node) is expediently effected by the respective boost and buck signals.

In some examples the switched inductance boost voltage converter circuitry further comprises a first boost circuit diode connecting in a forward direction the input node to a first connection of the boost switch. Providing a diode in this manner which connects the input mode from the electrical motor coil to a first connection of the boost switch in particular provides a level of protection for the boost switch by isolating the boost switch from the buck voltage converter circuitry, so that the risk of damage to the boost switch by the operation of the buck voltage converter circuitry is significantly reduced. Moreover the provision of this diode greatly reduces the occurrence of "ringing" (i.e. current oscillations) in the circuit. As a result of these factors, the intrinsic resilience of the boost switch can be reduced, i.e. the boost switch can be provided by a smaller, weaker and thus cheaper component, thus reducing the overall cost of the driver circuit.

In some examples, the switched inductance boost voltage converter circuitry further comprises a second boost circuit diode connecting in a forward direction the second electrode of the storage capacitor to the first connection of the boost switch. The provision of such a second diode in the switched inductance boost voltage converter circuitry can provide an additional level of protection for the boost switch against reverse currents which may occur in the driver circuit when the buck voltage converter circuitry is active.

In some examples the boost switch is an N-type field effect transistor. The configuration of the present driver circuit is particularly suitable for the boost switch to be provided by a relatively small switching device, such as a field effect transistor, rather than a more expensive, more heavy-duty device, such as an insulated gate bi-polar transistor (TGWU. Indeed, in some examples the boost switch may be provided by an N-type MOSFET. In contrast to prior art electrical motor coil driver circuits, the present techniques enable the driver circuit to be switched by such relatively weak components.

In some examples the switched inductance buck voltage converter circuitry further comprises a first buck circuit diode connecting in a forward direction a first connection of the buck switch to the input node. Analogously to the above-mentioned first boost circuit diode, this first buck circuit diode protects the buck switch from reverse currents when the boost voltage converter circuitry is active and further prevents ringing within the driver circuit.

In some examples the switched inductance buck voltage converter circuitry further comprises a second buck circuit diode connecting in a forward direction the first electrode of the storage capacitor to a second connection of the buck switch. The provision of this second buck circuit diode further prevents ringing in the switched inductance buck voltage converter circuitry of the driver circuit.

In some examples the buck switch is P-type field effect transistor. Similarly to the above comments with respect to the possibility of providing the boost switch by an N-type field effect transistor, the configuration of the present driver circuit is particularly suitable for the buck switch to be provided by a relatively small switching device, such as a field effect transistor, rather than an IGBT. In some examples the buck switch may be provided by a P-type MOSFET.

In some examples the switched inductance buck voltage converter circuitry further comprises reference circuitry configured to reference the buck signal to a ground connection and to provide at a gate of the buck switch a gate voltage which is referenced to a voltage at the first electrode of the storage capacitor. Given that there is the potential for the voltage of the first electrode of the storage capacitor to vary over a considerable range as the storage capacitor is charged and discharged by the actions of the boost voltage converter circuitry and the buck voltage converter circuitry, it is advantageous to provide such reference circuitry, such that the gate voltage of the (e.g. P-type field effect transistor) buck switch can be appropriately set with respect to the voltage of the storage capacitor despite the intrinsic voltage range tolerance of the buck switch potentially being considerably less than the voltage range experienced by the storage capacitor and the buck switch can thus switch correctly when the buck signal indicates that this should occur.

In some examples the reference circuitry comprises a voltage divider arranged to provide first and second resistive paths coupled to the gate of the buck switch, wherein the first resistive path connects the first electrode of the storage capacitor to the gate of the buck switch and the second resistive path connects the gate of the buck switch to the ground connection in dependence on the buck signal. Accordingly, this configuration of first and second resistive paths provides an arrangement in which the gate of the buck switch is coupled to the voltage provided at the point where the first and second resistive paths meet and thus by the appropriate setting of the resistance of the first and second resistive paths, the gate of the buck switch can be controlled to appropriately switch in dependence on the buck signal.

In some examples the second resistive path comprises an N-type field effect transistor arranged to connect the second resistive path to the ground connection in dependence on the buck signal. This second transistor in the buck voltage converter circuitry can thus enable the buck signal to be provided as a relatively low voltage digital signal, whilst allowing the buck switch to operate coupled to the storage capacitor which may then handle much higher voltages.

In some examples the first resistive path comprises a third buck circuit diode connecting in a forward direction the first electrode of the storage capacitor to the gate of the buck switch. This third buck circuit diode can be provided in association with the above-mentioned second buck circuit diode, such that the first electrode of the storage capacitor is coupled both to the second connection (e.g. source connection) of the buck switch and to the gate connection of the buck switch by parallel diodes. The third buck circuit diode can be configured to be of the same configuration as the second buck circuit diode, and as a result voltage and temperature variation can be compensated for by the parallel response of these two diodes.

In some examples the driver circuit further comprises a first buck circuit capacitor providing a gate-source connection for the buck switch. The provision of this capacitor can stabilize the operation of the buck switch, in particular by suppressing noise which could otherwise cause unwanted switching of the buck switch.

In some examples the first resistive path further comprises a second buck circuit capacitor in parallel with at least a portion of the first resistive path. This second buck circuit capacitor can further suppress noise in the circuit and may in particular be configured to be of a similar configuration to the first buck circuit capacitor to allow equal compensation on their respective paths to voltage and temperature variation.

In some examples the driver circuit further comprises control circuitry configured to provide the boost signal and buck signal, wherein the control circuitry is configured to begin assertion of either the boost signal or the buck signal when a current flow in the electrical motor coil is substantially zero. Configuring the driver circuit such that its switching takes place when the current flow is substantially zero further enables the components of the driver circuit, and in particular the boost and buck switches, to be provided by relatively "lightweight" (i.e. weak and thus inexpensive) devices.

In some examples the control circuitry is configured to assert the boost signal and the buck signal in mutual exclusion. This can provide a further level of protection for the components of the driver circuit, such that only one of the switched induction boost voltage converter circuitry and switched induction buck voltage converter circuitry is operative at any given time, and conflict between the two (in particular with respect to current driving directions) is avoided.

In some examples the control circuitry is configured to assert each of the boost signal and the buck signal as a single continuous pulse. This enables the control circuitry which provides these signals to be provided by a relatively simple configuration of a digital control device.

In some examples a driver board is provided for driving at least two electrical motor coils of a switched reluctance electrical motor comprising: a first driver circuit according to the first aspect for driving a first electrical motor coil of the at least two electrical motor coils; and a second driver circuit according the first aspect for driving a second electrical motor coil of the at least two electrical motor coils, wherein the first driver circuit and the second driver circuit are powered by a shared supply. Co-locating two driver circuits on a single driver board powered by a shared supply can be of particular benefit, most notably when the first and second electrical motor coils which are driven by the first and second driver circuits are arranged to be in opposing phases of operation with a respect to one another, such that the current flow in one driver circuit with a respect to the shared supply is opposite to that in the second driver circuit with respect to the shared supply and hence the net current draw on the supply can be significantly reduced, since the majority of the current flow can be between the first driver circuit and the second driver circuit and not on or off the driver board.

In some examples the driver board further comprises control circuitry configured to operate the driver board in four stages of operation in which: in a first stage of operation the first electrical motor coil is charged with current of a first polarity and the second electrical motor coil is charged with current of a second polarity, wherein the second polarity is opposite to the first polarity, in a second stage of operation the first electrical motor coil is discharged into the storage capacitor of the first driver circuit and the second electrical motor coil is discharged to the shared supply; in a third stage of operation the first electrical motor coil is charged with current of the second polarity and the second electrical motor coil is charged with current of the first polarity; and in a fourth stage of operation the first electrical motor coil is discharged to the shared supply and the second electrical motor coil is discharged into the storage capacitor of the second driver circuit. Accordingly, by coordinating the operation of each driver circuit in this manner the predominant current flow induced by the first and second driver circuits is co-ordinated, such that the predominant current flow is between the first and second driver circuits rather than to and from the shared supply. For example, in a configuration in which 1A of current comes from the supply to one driver circuit, the other driver circuit may be pushing back 0.75A of current into the supply at the same time. The net draw on the supply is therefore only 0.25A of current, and yet, by the opposing configuration (in terms of phase of operation) of the first driver circuit and the second driver circuit for their respective motor coils, 1.75A of current flows in the respective motor coils to generate magnetic field (and thus output torque of the electric motor). Most notably, since the coil energy is proportional to the square of the current, this gives 49× more energy delivered to the motor coils than is drawn from the supply ($1.75^2/0.25^2=49$). Although somewhat counter-intuitive, it should be remembered that this additional energy has previously been stored in the coils of the motor or the storage capacitor of a driver circuit, and the driver circuit provided by the present techniques enables this to be efficiently moved back and forth between the motor coil and storage circuitry, rather than providing "fresh" energy from the power supply to the motor coil at each cycle of its respective phase.

In some examples the driver board is configured to drive six electrical motor coils of the switched reluctance electrical motor and comprises six respective driver circuits according to the first aspect, each for driving a respective electric motor coil of the six electric motor coils, wherein the control circuitry is configured to drive the six driver circuits in three pairs, wherein the first driver circuit is paired with a fourth driver circuit, the second driver circuit is paired with a fifth driver circuit, and a third driver circuit is paired with a sixth driver circuit, and wherein for each pair of driver circuits the control circuitry is configured simultaneously to assert the boost signal of one driver circuit of that pair with the buck signal the other driver circuit of that pair. Co-locating the six respective driver circuits on one driver board in this manner facilitates the coordination between the three pairs of driver circuits and is particularly useful for driving six adjacent electrical motor coils in the switched reluctance electrical motor. Six adjacent electrical motor coils can be of significance for example when the switched reluctance electrical motor is configured to have a three: two ratio of stator to rotor teeth, such that for six adjacent stator teeth (around which respective coils are wound) only two will be aligned with rotor teeth for any given orientation of the rotor in the stator. Hence, for the coils of these six adjacent stator teeth exactly two of them require power at any one time and moreover these can be arranged such that when one channel (driving one coil) is pulling current from the power supply, the other channel (driving the other coil) is providing it back, and the net effect is the energy from the providing channel goes directly into the pulling channel (on the same driver board) without tapping the supply for more energy than is necessary to recover a few percent of losses on that cycle.

In some examples the control circuitry is configured to selectively disable each pair of driver circuits. Although the electric coil motor will operate most powerfully with all three pairs of driver circuits enabled, it is not necessary for all three pairs to be operational for the electrical motor to work, and therefore the electrical motor can be operated in a lower power configuration when at least one of the pair of driver circuits is thus disabled.

In some examples a switched reluctance electrical motor driver apparatus is provided comprising four driver boards according to the second aspect, configured to drive twenty four electrical motor coils of the switched reluctance electrical motor independently of one another, and configured to drive each of the twenty four electrical motor coils with respect to a selected phase of an at least six phase cycle of operation.

In some examples the switched reluctance electrical motor drive apparatus is configured to selectively disable each driver board. Each driver board is thus configured to drive six of the twenty four electrical motor coils of the switched reluctance electrical motor and may for example thus correspond to a quadrant of the electrical motor. Hence each quadrant of the electrical motor may be selectively switched off in order to operate the electrical motor in a lower power configuration.

In some examples the switched reluctance electrical motor driver apparatus comprises eight driver boards according to the second aspect, and configured to drive forty eight electrical motor coils of the switched reluctance electrical motor in the at least six phase cycle of operation, wherein pairs of electrical motor coils are driven with a same phase of the at least six phase cycle. For example, the electrical motor may be configured to have two distinct stator sections dividing the longitudinal length of the electrical motor into two parts. According to the present techniques each of the forty eight electrical motor coils could thus be individually controlled and driven, however in some examples the two stator sections are configured to be driven in parallel with one another, such that the same phase of the phase cycle is applied to two electrical motor coils, one in each stator section.

In some examples a method of operating a driver circuit to drive an electrical motor coil is provided comprising the steps of: charging the electrical motor coil with current of a first polarity from an electrical supply discharging the electrical motor coil into a storage capacitor of the driver circuit; charging the electrical motor coil with current of a second polarity from the storage capacitor of the driver circuit, the second polarity being opposite to the first polarity; and discharging the electrical motor coil to the electrical supply.

In some examples a driver circuit for driving an electrical motor coil is provided comprising: means for charging the electrical motor coil with current of a first polarity from an electrical supply; means for discharging the electrical motor coil into a storage capacitor of the driver circuit; means for charging the electrical motor coil with current of a second polarity from the storage capacitor of the driver circuit, the second polarity being opposite to the first polarity; and means for discharging the electrical motor coil to the electrical supply.

In some examples an apparatus is provided comprising: a switched reluctance electrical motor comprising a rotor section and a stator section, the rotor section comprising a plurality of rotor teeth and the stator section comprising at least 12 stator teeth, each stator tooth wound with a respective coil; and a motor driver circuit for driving an electrical motor coil of the coils of the switched reluctance electrical motor, wherein the motor driver circuit comprises: switched inductance boost voltage converter circuitry comprising a storage capacitor and an input node arranged to he coupled to the electrical motor coil; and switched inductance buck voltage converter circuitry comprising the input node and the storage capacitor, wherein inductance of the switched inductance boost voltage converter circuitry and of the switched inductance buck voltage converter circuitry is provided when the input node is coupled to the electrical motor coil, and an output of the switched inductance boost voltage converter circuitry is a voltage developed across the storage capacitor and an input of the switched inductance buck voltage converter circuitry is the voltage developed across the storage capacitor.

Some particular examples are now described with reference to the accompanying figures.

FIG. 1 schematically illustrates a switched reluctance electrical motor system 10 in one example. The electrical motor comprises a rotor section 12 configured to rotate within two stator sections 14 and 16. The rotor section is configured to have sixteen rotor teeth, which form longitudinal spines extending radially outward and running along the length of the rotor section through both stator sections 14 and 16. Each stator section is configured to have twenty tour stator teeth, which form longitudinal spines extending inwardly and also running along the length of each stator section. Each stator tooth is wound with a coil comprising a high number of turns—in this instance there being approximately two hundred. In the example illustrated in FIG. 1 there are no coils on the rotor teeth, as the magnetic fields generated by powering the stator teeth coils cause the motor to rotate by the action of those magnetic fields on the rotor.

The electrical motor system 10 further comprises stator coil driver circuitry 20, which is configured to be controlled by the associated control circuitry 22. A power supply 24 is coupled to both the stator coil driver circuitry and to the stator coils of the motor. As such there can be current flow both between the stator coils and the supply 24 and between the stator coils and the stator coil driver circuitry 20. The significance of this arrangement will become apparent from the description of the further figures.

Figure 2:
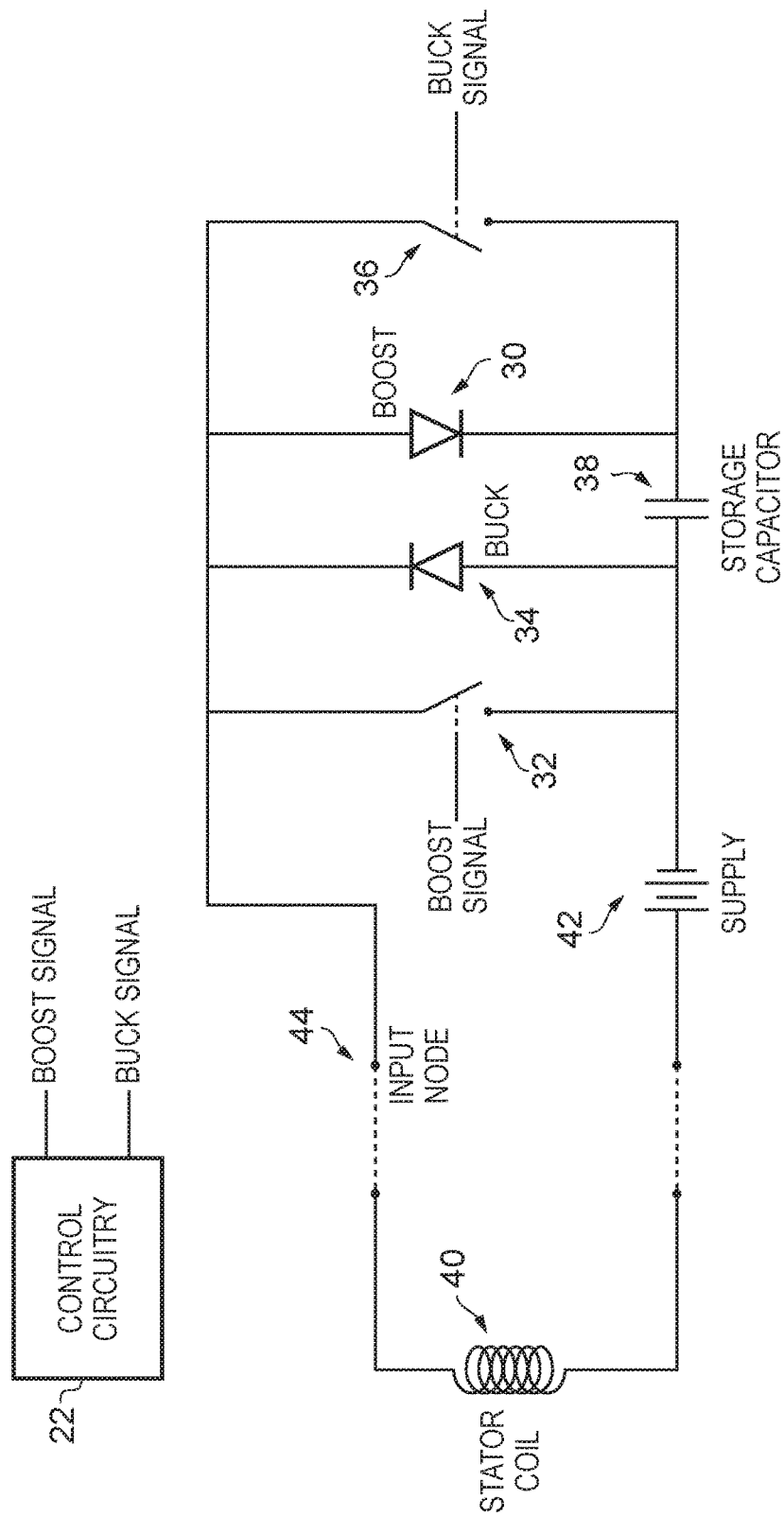
FIG. 2 schematically illustrates a coil driver circuit in one example.

FIG. 2 schematically illustrates the principal components of the stator coil driver circuitry associated with a single stator coil. In essence the circuitry shown in FIG. 2 is a combination of switched inductance boost voltage converter circuitry and switched inductance buck voltage converter circuitry. The switched inductance boost voltage converter circuitry comprises the boost diode 30 and the boost switch 32 and the switched inductance buck voltage converter circuitry comprises the buck diode 34 and the buck switch 36. The switched inductance boost voltage converter circuitry and the switched inductance boost voltage converter circuitry share the storage capacitor 38. Each is also connected, via the input node 44, to the stator coil 40 which is driven by this circuit and the supply 42. The control signals for the boost switch 32 and the buck switch 36, namely the boost signal and the buck signal respectively, are generated by the control circuitry (which here is represented by the same control circuitry 22 as shown in FIG. 1).

In operation the boost and buck signals of the example of FIG. 2 are asserted in mutual exclusion by the control circuitry 22 to cause the stator coil 40 to be powered, and moreover to be driven hi-directionally, wherein current is first caused to flow one way through the stator coil (during "boost" operation) and then to flow the other way through the stator coil (during "buck" operation). Asserting the boost signal to cause the boost switch 32 to close (conduct) causes the supply voltage provided by the supply 42 to be applied to the stator coil 40. The boost signal is asserted for a suitable period until the current flow in the stator coil is generating the required magnetic field for operation of the motor. When the boost signal is switched off, opening the boost switch 32, the current continues to flow (via the boost diode 30) as the energy is dissipated from the coil. This energy dissipated from the stator coil 40 is collected by charging the storage capacitor 38. This quickly boosts the storage capacitor to a static voltage which shuts down the current in the coil.

This "boosted voltage" stored in the storage capacitor 38 is then available for energizing the stator coil 40 in the opposite direction. When this is required the buck signal is asserted to cause the buck switch 36 to close (conduct) and the previously boosted voltage can be applied (via buck diode 34) to the stator coil 40 in the opposite direction to that of the boost phase.

Figure 3:
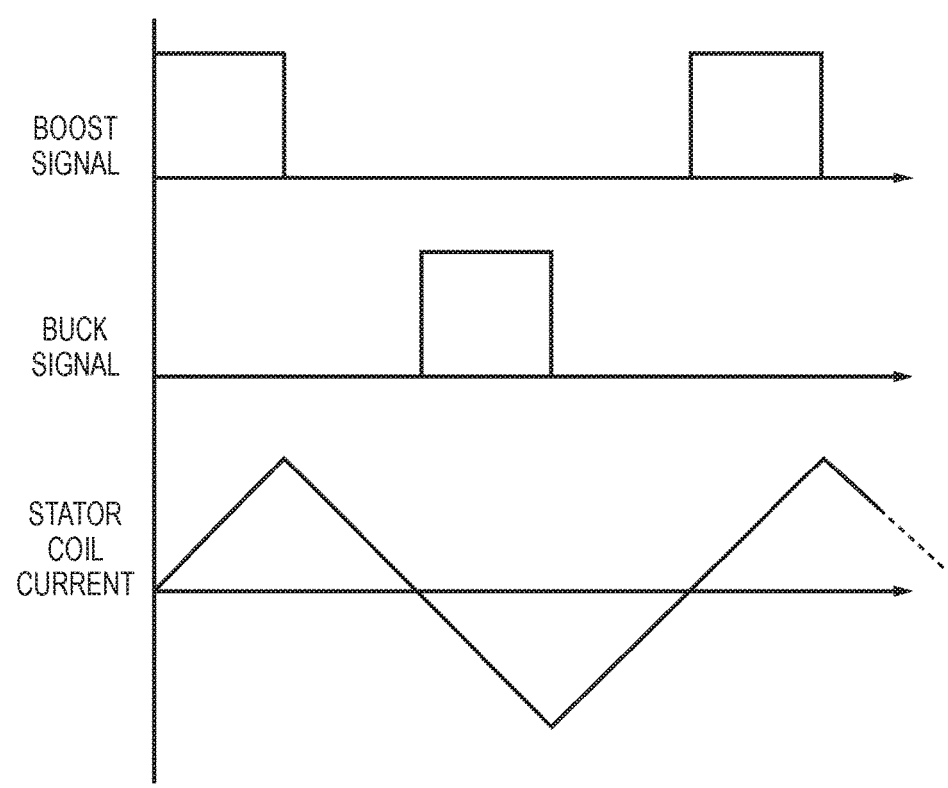
FIG. 3 shows the use of a boost signal and a buck signal in the circuit of FIG. 2 to cause variation in a stator coil current.

FIG. 3 illustrates the cyclical operation of the circuit shown in FIG. 2, in which the stator coil current is caused first to be driven in one (e.g. positive) direction by the assertion of the boost signal, whereafter the stator coil current is caused to be driven in the other (e.g. negative) direction by the assertion of the buck signal. Note that the assertion of the buck signal does not take place until the stator coil current has fallen to zero. This means that in the driver circuit voltages are switched when currents are low and currents are switched when voltages are low, making the power dissipation in the switching devices quite small. As will be discussed in more detail with reference to the example shown in FIGS. 5A, 5B and 6 this means that relatively lightweight switches (e.g. MOSFETs, instead of more expensive IGBTs) can be used as the switches in the circuit.

Figure 4:
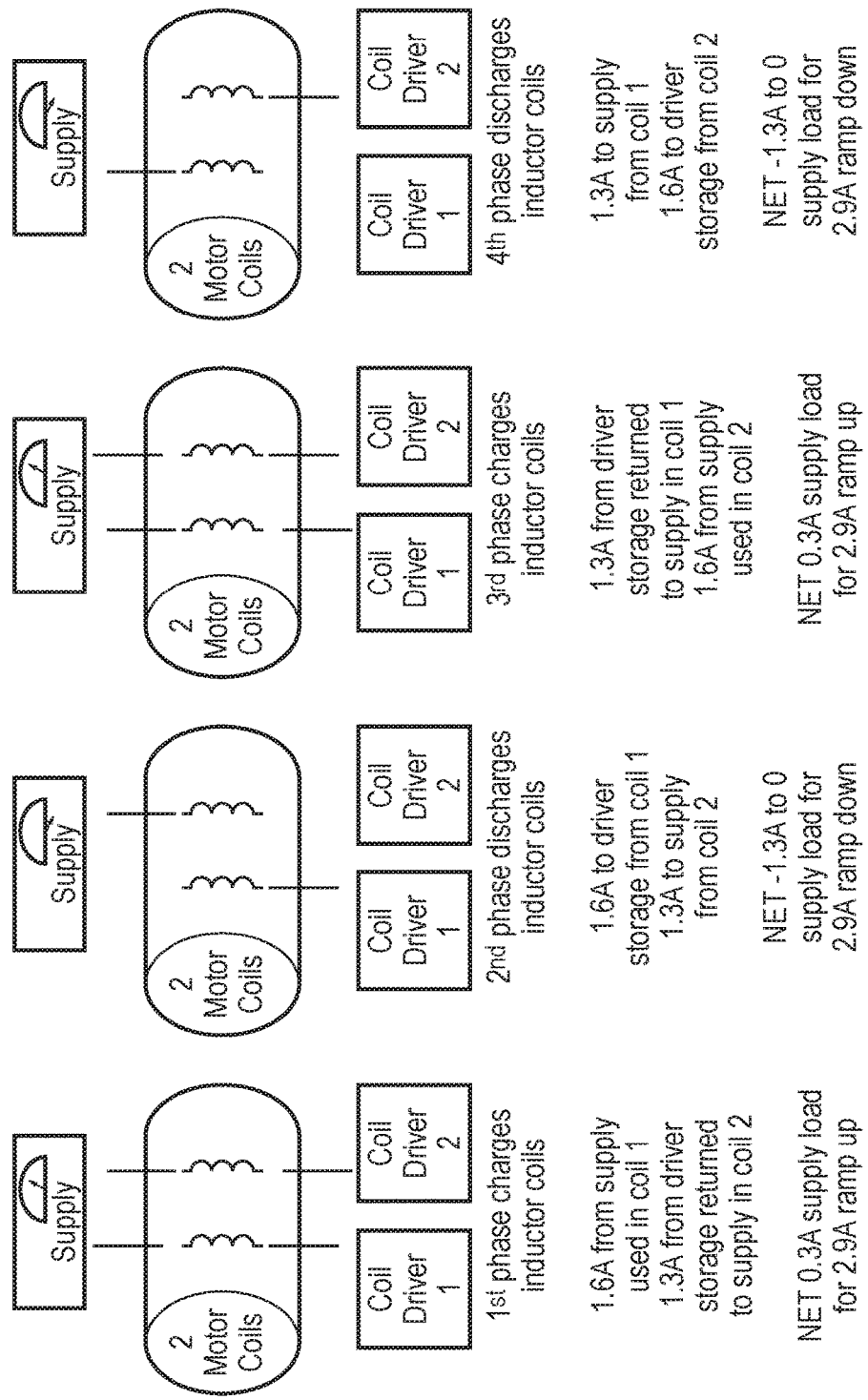
FIG. 4 shows the four phase operation of two coil driver circuits and the resulting current flows in one example.

A particular advantage of the present techniques with respect to driving electrical motor stator coils can be seen from FIG. 4, which illustrates a four phase process by which two stator coils are driven in one example. Two stator coils are each coupled to a shared (DC) supply and to their own respective coil driver circuits.

In the first phase both motor coils are charged, but in opposite directions. The first motor coil is charged with current of a first polarity from the shared supply and the second motor coil is charged with current of a second (opposite) polarity from the storage capacitor of the second driver circuit. In the example given in the figure, 1.6A from the supply is provided to the first coil, whilst 1.3A deriving from the storage capacitor of the second driver circuit is returned to the supply via the second coil. As a result for a net 0.3A supply load a sum coil ramp up corresponding to 2.9A is achieved.

In the second phase both motor coils are discharged, again in opposite directions. The first motor coil is discharged into the storage capacitor of the first driver circuit and the second electrical motor coil is discharged to the shared supply. In the example given in the figure, 1.6A is passed from the first coil to the storage capacitor of the first driver circuit, whilst 1.3A is returned to the supply deriving from the second coil. As a result for a net supply load falling from −1.3A to zero a sum coil ramp down of 2.9A is achieved.

In the third phase both motor coils are charged again, but in the opposite direction to in the first phase. The first motor coil is charged with current of the second polarity from the storage capacitor of the first driver circuit and the second motor coil is charged with current of the first polarity from the shared supply. In the example given in the figure, 1.3A deriving from the storage capacitor of the first driver circuit is returned to the supply via the first coil, whilst 1.6A from the supply is provided to the second coil. As a result for a net 0.3A supply load a sum coil ramp up corresponding to 2.9A is achieved.

Finally in the fourth phase both motor coils are again discharged. The first motor coil is discharged to the shared supply and the second electrical motor coil is discharged into the storage capacitor of the second driver circuit. In the example given in the figure, 1.3A is returned to the supply deriving from the first coil, whilst 1.6A is passed from the second coil to the storage capacitor of the second driver circuit. As a result for a net supply load falling from −1.34 to zero a sum coil ramp down of 2.9A is achieved.

Figure 5A:
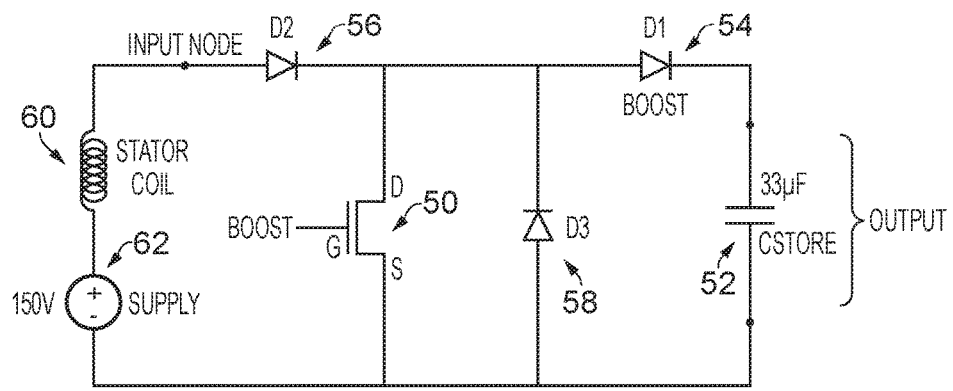
FIG. 5A schematically illustrates switched inductance boost voltage converter circuitry forming part of a driver circuit in one example.
Figure 5B:
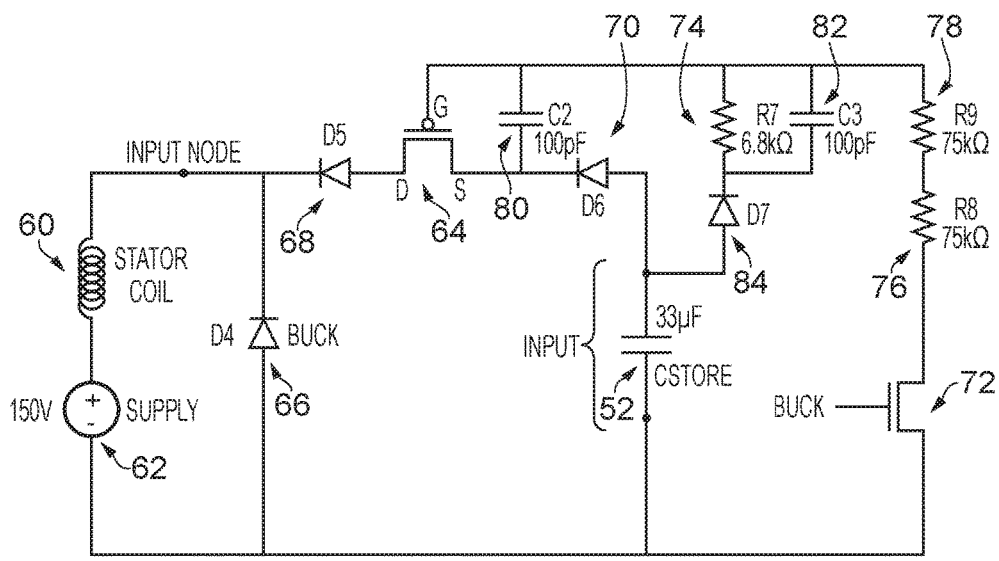
FIG. 5B schematically illustrates switched inductance buck voltage converter circuit forming part of a driver circuit in one example.
Figure 6:
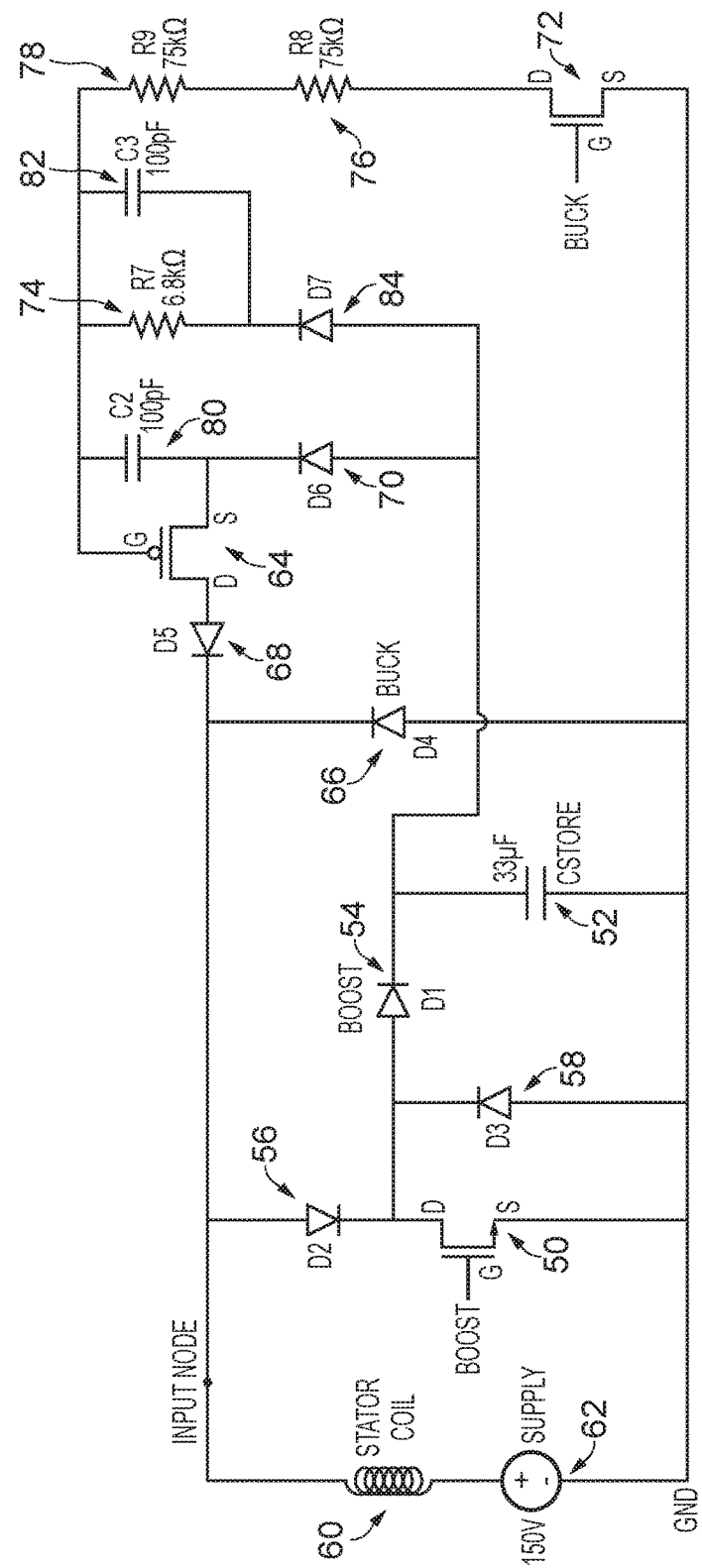
FIG. 6 schematically illustrates a driver circuit in one example.

More detail of the configuration of a driver circuit in one example is now given with reference to FIGS. 5A, 5B and 6. The switched inductance boost voltage converter circuitry is represented separately in FIG. 5A, whilst the switched inductance buck voltage converter circuitry is represented separately in FIG. 5B, and the combined driver circuit having both switched inductance boost voltage converter circuitry and switched inductance buck voltage converter circuitry is shown in FIG. 6.

In the switched inductance boost voltage converter circuitry of FIG. 5A the boost switch is provided by the NMOS 50, whilst the storage capacitor (CSTORE) is provided by the 33 μF capacitor 52. Note that in addition to the boost diode (D1) 54, two further diodes D2 56 and D3 58 are also provided in this example. The boost voltage converter circuitry is coupled to the stator coil 60 and the 150V DC supply 62.

With regard to the switched inductance buck voltage converter circuitry of FIG. 5B, it is important to note that the storage capacitor (CSTORE) is the same 33 µF capacitor 52 as shown in FIG. 5A. As labelled in FIGS. 5A and 5B, the voltage developed across the capacitor 52 can be viewed as the output of the switched inductance boost voltage converter circuitry of FIG. 5A and as the input of the switched inductance buck voltage converter circuitry of FIG. 5B. Also the buck voltage converter circuitry is coupled to the same stator coil 60 and the same 150V DC supply 62. In the example shown in FIG. 5B the buck switch is provided by the PMOS 64. In addition to the buck diode 66 (D4), two further diodes 68 and 70 (D5 and D6) are also provided in this example. Finally the switched inductance buck voltage converter circuitry of FIG. 5B also comprises reference circuitry coupled to the gate of the buck switch (PMOS 64). This reference circuitry is composed of NMOS 72, resistors 74, 76 and 78 (R7, R8 and R9), capacitors 80 and 82 (C2 and C3) and diode 84 (D7).

More detail of the configuration of the full driver circuit in this example, showing its switched inductance boost voltage converter circuitry and its switched inductance buck voltage converter circuitry in their combined configuration is now given with reference to FIG. 6. The components of the driver circuit of FIG. 6 have the same reference numerals as the components shown in FIGS. 5A and 5B, since these latter separate representations are only shown separately to emphasise the respective part to which each component of the full driver circuit belongs.

The various additional diodes (i.e. in addition to the boost and buck diodes shown in FIG. 2) that are provided in this example serve a number of purposes, but overall a particular role that they play is to enable the critical switching devices (boost switch 50 and buck switch 64) to be provided by very cheap MOSFET devices (instead of much more expensive IGBT devices, say), despite the size of motor coil and the supply voltage required for the motor (e.g. a 35 mH coil and a 150V DC supply). The large EMF and rapid voltage changes associated with operating a motor with this kind of configuration has the potential to cause damaging voltages and gate-step (turning them on when supposed to be off) so these diodes are used throughout the circuit to provide power blocking that protects the switches. The diodes also serve to separate the switched inductance boost voltage converter circuitry from the switched inductance buck voltage converter circuitry, such that the operation of one does not risk damage to the components of the other. For example the combination of the diodes 68 and 70 (D5 and D6) placed either side of PMOS 64 in the buck voltage converter circuitry prevents the power of the current flow discharging from the coil from turning this PMOS on and off during the "boost" mode of operation of the driver circuit (and thus adversely affecting correct operation of that boost mode and risking damage to this other components of the buck voltage converter circuitry).

Note that the transistor 64 is provided as a PMOS (as opposed to a cheaper NMOS) device, since when in the "buck" mode of operation and bucking through the inductance (coil) to the supply, the inductor (stator coil 60) pulls current through the buck diode 66, dropping the switch there to one diode drop below ground. This works when using a PMOS for transistor 64, since it just adds a little more drop on its drain. An NMOS device could in principle be used, but because of the above-mentioned pull down to below ground (which would be on the source of the NMOS device), additional circuitry would be required to provide its gate voltage at a below-ground level, since otherwise it could not be turned off when the inductor (stator coil 60) is discharging.

Additionally, the diodes in the circuit provide a rectifying function to rectify oscillations (ringing) that otherwise would strongly occur when driving a large capacitor from a large inductor.

The capacitors 80 and 82 (C2 and C3) are provided to suppress noise in the circuitry that could otherwise affect the stability of the switching of the gate of the buck switch (PMOS 64), the gate of this transistor being in particular susceptible to such noise by virtue of its connection to the storage capacitor 52 (albeit via the diodes 70 and 84 (D6 and D7). The capacitors 80 and 82 also form part of the reference circuitry, which notably further comprises the resistors 74, 76 and 78 (R7, R8 and R9) and the NMOS transistor 72. The provision of this reference circuitry enables the buck signal (BUCK) to be referenced to ground (GND) and the gate signal of the buck switch 64 to be referenced to the voltage present on the upper side (as illustrated in FIG. 6) of the storage capacitor 52. Hence, switching of the digital (low voltage) BUCK signal is able to correctly control the switching of the buck switch 64 by virtue of setting a correct source-drain threshold voltage (with respect to the voltage seen on the storage capacitor). Note that the parallel configuration of the diodes 70 and 84 (D6 and D7), the capacitors 80 and 82 (C2 and C3) and the resistors 74 and 76/78 (R7 and R8/R9) enable the circuitry to perform consistently across a range of voltage and temperature variation, due to the equivalent response that each these components in their respective pairs will have to that temperature and voltage variation. Note that logically the resistors 76 and 78 (R8 and R9) can be considered to form a single resistor, though are provided as two distinct components in this example for reasons of lower cost and size, as well as improved power dissipation. The provision of the diodes 70 and 84 (D6 and D7) also reduces the gate drop needed to be provided by the remainder of the reference circuitry, further reducing the cost of the resistive components that need to be explicitly provided (since they have lower power requirements) and allow a range of voltages to more easily be handled.

Figure 7:
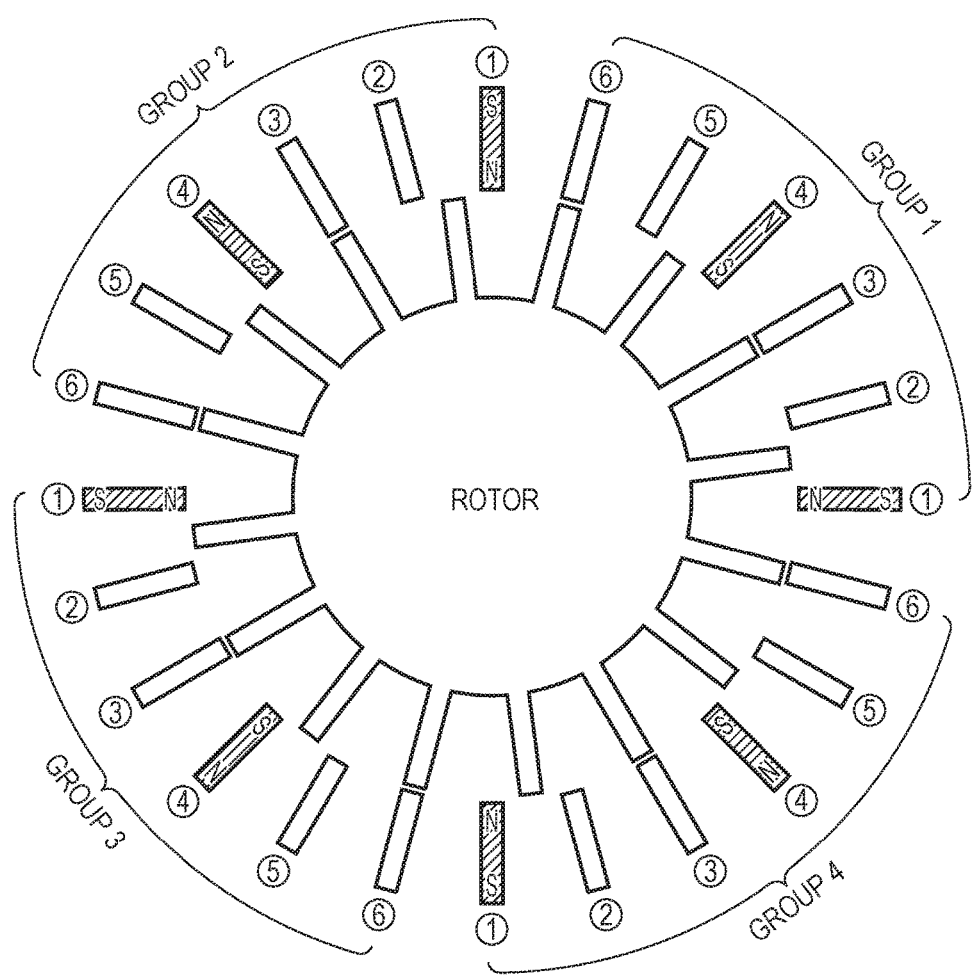
FIG. 7 shows an end view of a switched reluctance electrical motor in one example having 16 rotor teeth and 24 stator teeth.
Figure 12:
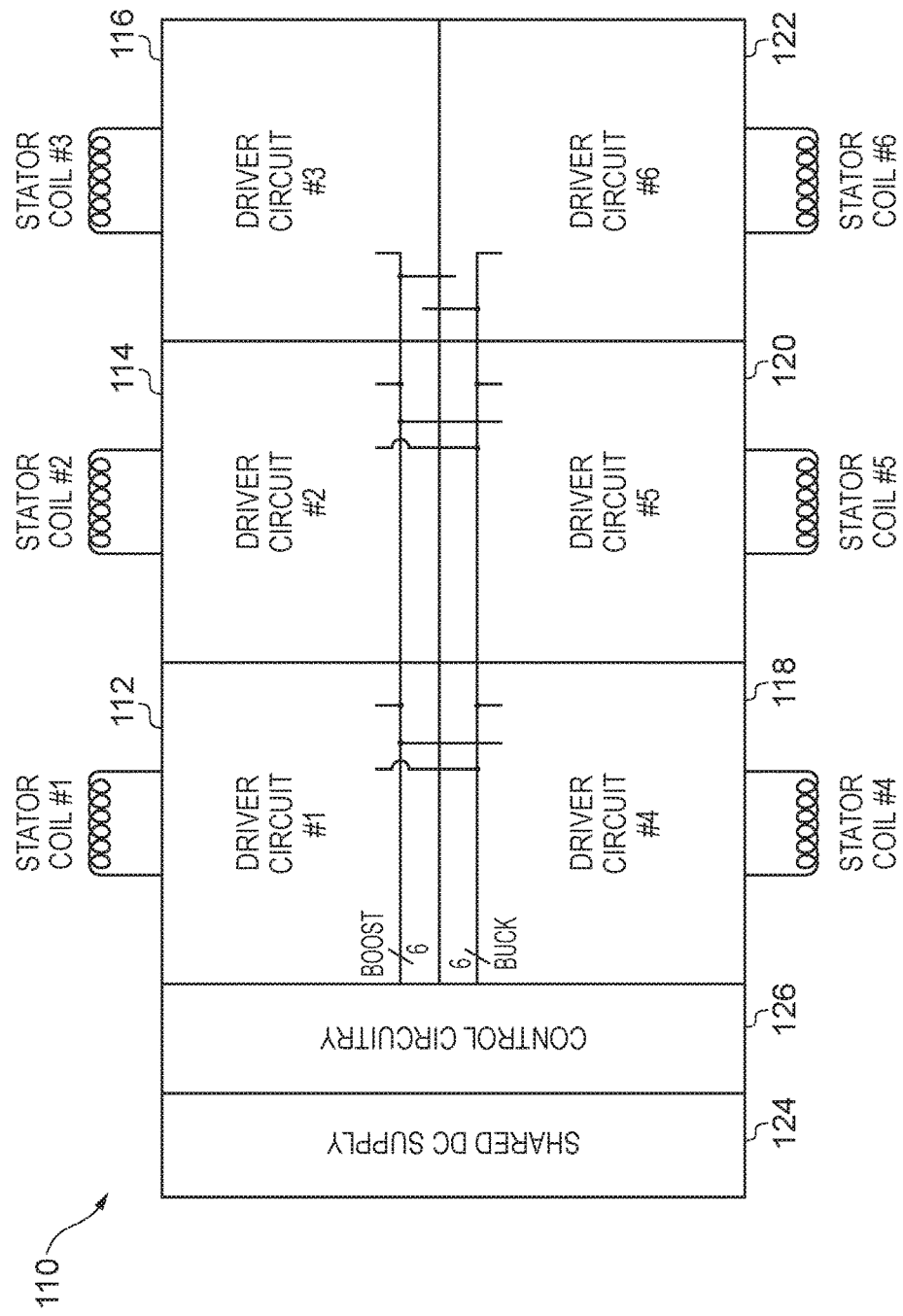
FIG. 12 schematically illustrates a driver board comprising 6 electrical motor coil driver circuits in one example.

FIG. 7 schematically illustrates a radial view of the rotor section and the teeth of one stator section in one example. In this example control over the coils (not illustrated) of the stator section is arranged such that groups of 6 stator teeth have been put together and the cyclical control sequence asserted over each group runs through six stages, corresponding to the six stator teeth in that group. A further feature of this example, to be discussed in more detail below with reference to FIG. 12, is that the driver circuits associated with each stator coil in a group are provided on one board which shares control circuitry and a single DC supply, so that the above-mentioned benefits of one driver circuit operating in "buck mode", whilst another driver circuit which shares the same supply is operating in "boost mode" can result. FIG. 7 further illustrates a snapshot of one stage of the six stage cycle in which a first stator coil in each group (labelled 1 in the figure) is currently being powered in a first direction (boost mode) in this example, in which the resulting magnetic field induced in the stator tooth is oriented north (N) radially inwards and south (S) radially outwards, whilst the fourth stator coil in each group is simultaneously being oppositely powered (buck mode) in this example, such that the magnetic field induced in the stator teeth is orientated south (S) radially inwards and north (N) radially outwards. Driving the stator coils of this electrical motor continues in this paired opposing induced magnetism fashion, wherein at the next stage stator teeth 2 and 5 are driven (oppositely with respect to one another), followed by stator teeth 3 and 6, followed by stator teeth 1 and 4 (in the opposite magnetic configuration to the first phase) and so on.

Still referring to FIG. 7, note that the configuration of the rotor and stator teeth (in particular the 2:3 ratio of their number) results in an arrangement in which when half of the rotor teeth are directly aligned with corresponding stator teeth, the other half of the rotor teeth are unaligned with the stator teeth (being aligned with the centre of the gap between two stator teeth in this example). For an aligned pair of rotor/stator teeth this means that there is only a relatively small air gap (e.g. less than 0.5mm) between the rotor tooth and the stator tooth. Which corresponds to a low reluctance and hence no output power (zero torque) from the motor. Conversely the non-alignment of the other stator teeth of the set of six stator teeth with corresponding rotor teeth can thus provide a high reluctance and high torque configuration (due to the larger air gap, e.g. more than 1.0 mm) between the non-aligned stator/rotor teeth). Whilst in known switched reluctance electric motors partial overlap between the rotor and stator teeth may be required in order to keep the motor in a configuration where reluctance is low for an acceptable efficiency, but torque can still be achieved—although at a level below the maximum possible, the present electrical motor system achieves an improved trade-off between torque and efficiency by providing a configuration in which higher torque can be generated (by the non-aligned stator/rotor teeth), but also in which energy that is expended in generating a magnetic field which doesn't get used gets recycled, thus improving the efficiency.

Figure 8:
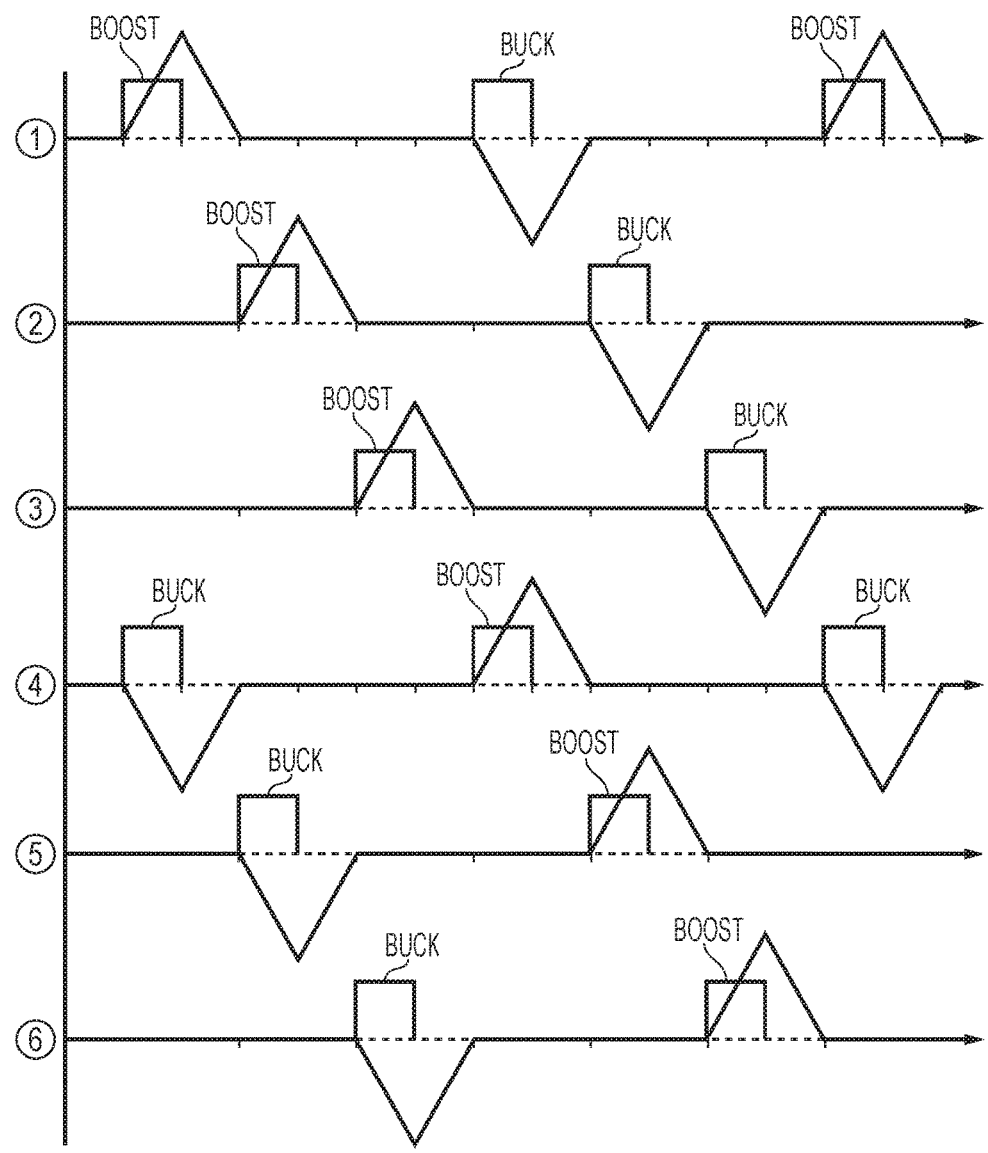
FIG. 8 illustrates a six stage control operation for a group of 6 stator coils in one example.

FIG. 8 schematically illustrates the relative timing of the boost and buck signals in the driver circuits which provide the above-described control over the set of six stator teeth in each group. The above mentioned pairing over the control over stator coils 1/4, 2/5 and 3/6 can be seen, in which the stator coil of each pair is always driven by a driver circuit in opposite mode (boost/buck) and the resulting current flow (triangular wave forms in the figure) is always of opposite plurality. Note that the start of the assertion of the boost and buck signals only begins when the current in the respective circuit is zero (or at least negligible) to ensure that the components of the respective driver circuits are not damaged by any residual opposing current flow. The sequence of control signals shown in FIG. 8 is applied to each of the four groups of stator coils shown in FIG. 7 when the electrical motor is configured to be in a full power configuration, however it is also possible for the electrical motor to operate in a lower power configuration when at least one of the groups of stator coils is not powered. This may be achieved by varying the boost and buck control signals asserted, which may in turn be achieved by switching off one or more driver circuits or one or more driver boards as appropriate. Additionally, it should be noted that the speed at which the motor operates is thus determined by the timing sequence of boost and buck signals applied (such as in FIG. 8) and not on the particular power level at which the motor is operating. The power level may be determined by the size of the current pulses which result from the chosen boost and buck signal durations. Hence, for example, for approximately similar power levels, the motor may be operated at two significantly different speeds (e.g. 500 rpm and 1000 rpm). This independence of the rotational speed from the operational power level adds significant flexibility to the user's choice of how to operate the motor, dictating the rotational speed by means of the timing sequence and the overall operational power level by the choice of which groups of stator coils to power. Moreover the fact that the user has such direct and independent control over the rotational speed of the motor means that in many circumstances the transmission or gearing provided in association with a traditional electric motor can be dispensed with.

Figure 9:
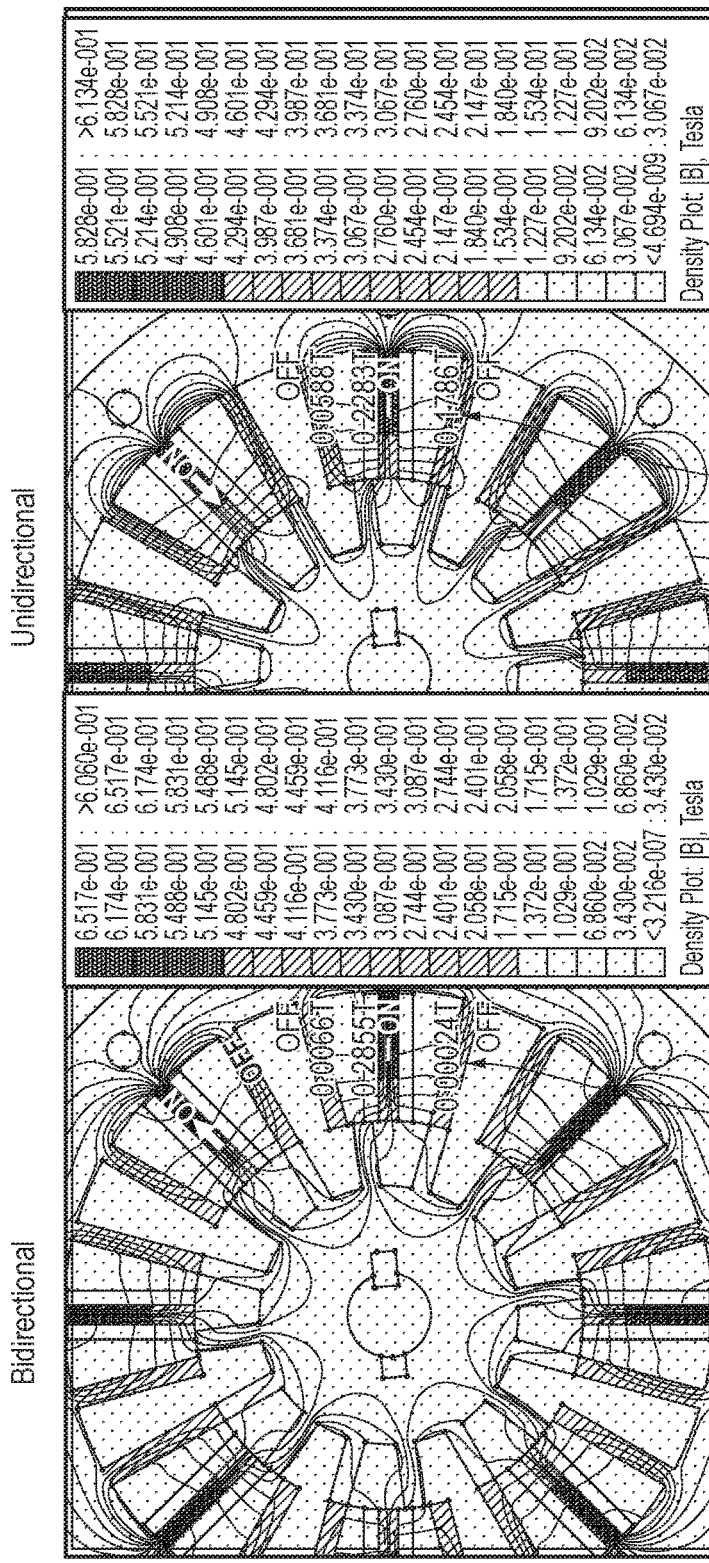
FIG. 9 shows a simulation of the magnetic field density for a switched reluctance motor powered by a bidirectional coil driver circuit of one example compared to configuration which only provides unidirectional current.

FIG. 9 shows a simulation of the magnetic fields which develop in one operational state of an example electrical motor when viewed in the same radial presentation as that of FIG. 7. This (shown on the left hand side) is labelled "bidirectional" and corresponds to driver circuits according to the present techniques being used to simultaneously drive pairs of stator coils in a group in opposite directions. For comparison a second simulation (shown on the right hand side) is labelled "unidirectional" and corresponds to a configuration in which instead pairs of stator coils in a group are simultaneously driven in the same direction. The magnetic field notations (in Tesla) are what occur in the air gaps between the stator teeth. When measured in the air gap, it can be seen that (for the bidirectional case by comparison with the unidirectional case) the resulting ON field is about 25% greater, the top OFF field is about 9 times smaller and the bottom OFF field is nearly 750 times smaller. The increased ON field increases torque and the decreased OFF fields reduce drag. This is due to the fact that the bidirectional configuration creates reinforcing magnetic fields in the electrical motor—and in particular in the rotor section—which further enhance the efficiency of this motor system.

Figures 10A, 10B:
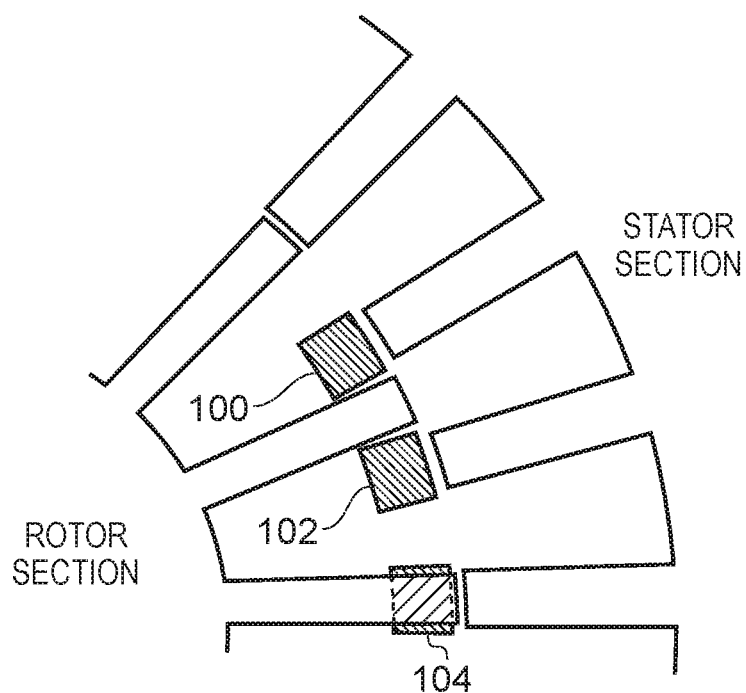
FIG. 10A schematically illustrates the placement of 3 optical sensors to provide rotational position information for the rotor with respect to the stator in an electrical motor in one example.
FIG. 10B shows the set of six possible optical sensor outputs for the three optical sensors shown in FIG. 10A.

FIGS. 10A and 10B illustrate the use of optical sensors to provide relative position information for the rotor section with respect to the stator section(s). FIG. 10A shows three optical sensors 100, 102, 104 positioned aligned with three of the stator teeth, and sized and calibrated such that a) when a rotor tooth is aligned with an optical sensor and stator tooth, only one optical sensor registers the presence of a rotor tooth and b) as the rotor rotates with respect to the stator section, at most two of the optical sensors register the presence of rotor teeth. This configuration means that with only three optical sensors (ultimately resulting in three bits of information—possibly after analogue to digital conversion, depending on the type of sensor used) the relative orientation of the rotor to the stator can be determined to within 2.5° (for this 16 rotor teeth/24 stator teeth example configuration). Moreover there are no intermediate positions in which no information about the relative rotor-stator position is available and as such whatever position the motor stops in it can always be known which stator coils to activate to get the motor running. FIG. 10B shows the corresponding three optical sensor outputs as the rotor rotates with respect to the stator.

Figure 11A:
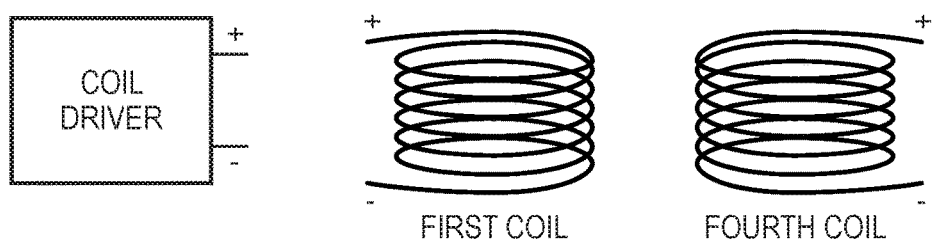
FIGS. 11A and 11B schematically illustrate two examples of how the magnetic field polarity in a motor coil may be inverted.
Figure 11B:
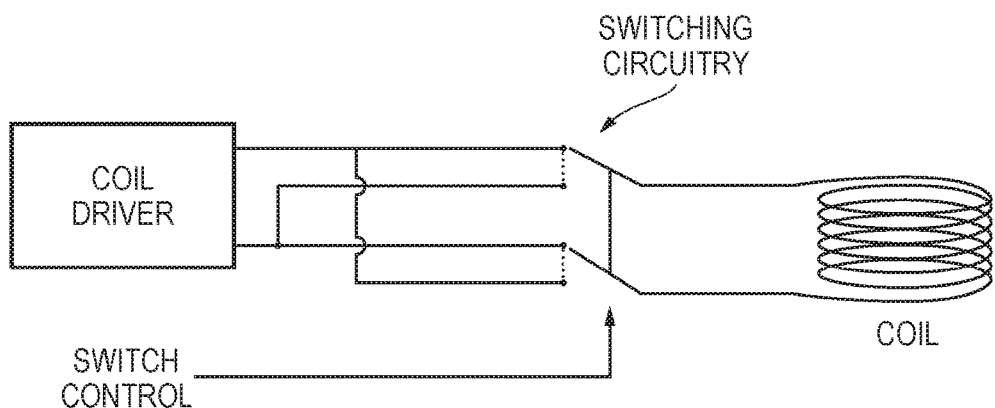

In some example configurations the direction of the electrical power through a stator coil—and hence the direction of the resulting magnetic field—may be brought about by a particular configuration of the connections to the coil. FIG. 11A shows one example configuration in which a coil driver circuit can be used to provide the power to both of a pair of stator coils which are active at a time, but activated in opposite directions (in the figure this being the first and fourth coil in a group of six). The winding of the first and the fourth coils has been made in the opposite sense to each other, so that for one polarity of electrical power provided by the coil driver, oppositely oriented magnetic fields in the first and fourth stator teeth results. FIG. 11B shows another example configuration in which additional switching circuitry is provided in association with each stator coil, controlled by a switch control signal which determines the direction of current flow through the coil. The switch control signal could either be provided by the coil driver or for example by the control circuitry which controls the coil driver.

FIG. 12 schematically illustrates a driver board in one example. This driver board is provided as a single integrated circuit board on which six driver circuits 112, 114, 116, 118, 120 and 112 (for example configured as shown by FIG. 6), control circuitry 126 and shared DC supply 124 are arranged. The control circuitry provides the boost and buck control signals individually to each of the driver circuits. The provision of the shared DC supply on the same board as the six driver circuits means that the above-described (for example with respect to FIG. 4) majority movement of current within the board (as opposed to on and off the board) is supported.

Figure 13:
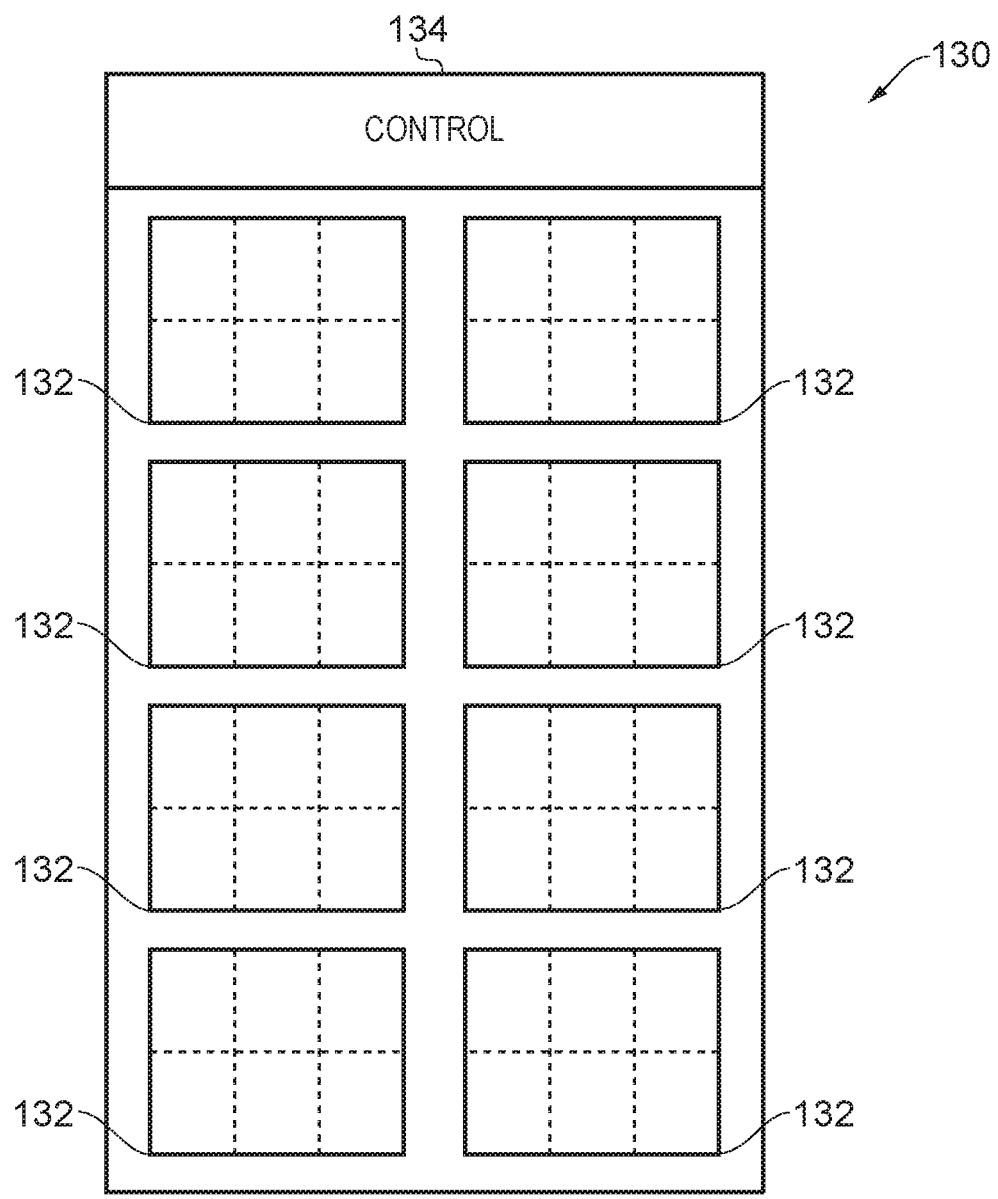
FIG. 13 schematically illustrates a switched reluctance electrical motor driver apparatus comprising eight driver boards as shown in FIG. 12 in one example.

FIG. 13 schematically illustrates a complete switched reluctance electrical motor driver apparatus 130 in one example which comprises eight driver boards 132 (for example configured as shown by FIG. 12) and is hence configured to control 48 individual stator teeth (as are present in the example motor system shown in FIG. 1). An overall control unit 134 also forms part of the apparatus 130 and dictates the high-level operation of the eight driver boards 132, for example causing individual driver boards to be temporarily switched off when the electrical motor should operate in a lower power mode and when each individual driver board is coupled to a set of stator coils (for example a quadrant in each stator section) which can be switched off to effect this low power mode. It is important to appreciate however that the combination of driver circuit control provided by the overall control 134 and the board controls 126 are such that firstly any individual driver circuit can be switched on or off regardless of the operation of the other driver circuits and secondly the control over each stator coil provided by each driver circuit is fully independent of the control over any other stator coil provided by any other driver circuit. As such therefore, the electrical motor driver apparatus 130 thus provides individual control over up to 48 driver circuits and hence stator coils, although in the light of the above discussion about groups of stator coils and pairs of driver circuits it may be chosen to closely link the operation of some driver circuits due to the benefits which result, and in such a configuration the phases of electrical power provided to various stator coils may be the same.

Figure 14:
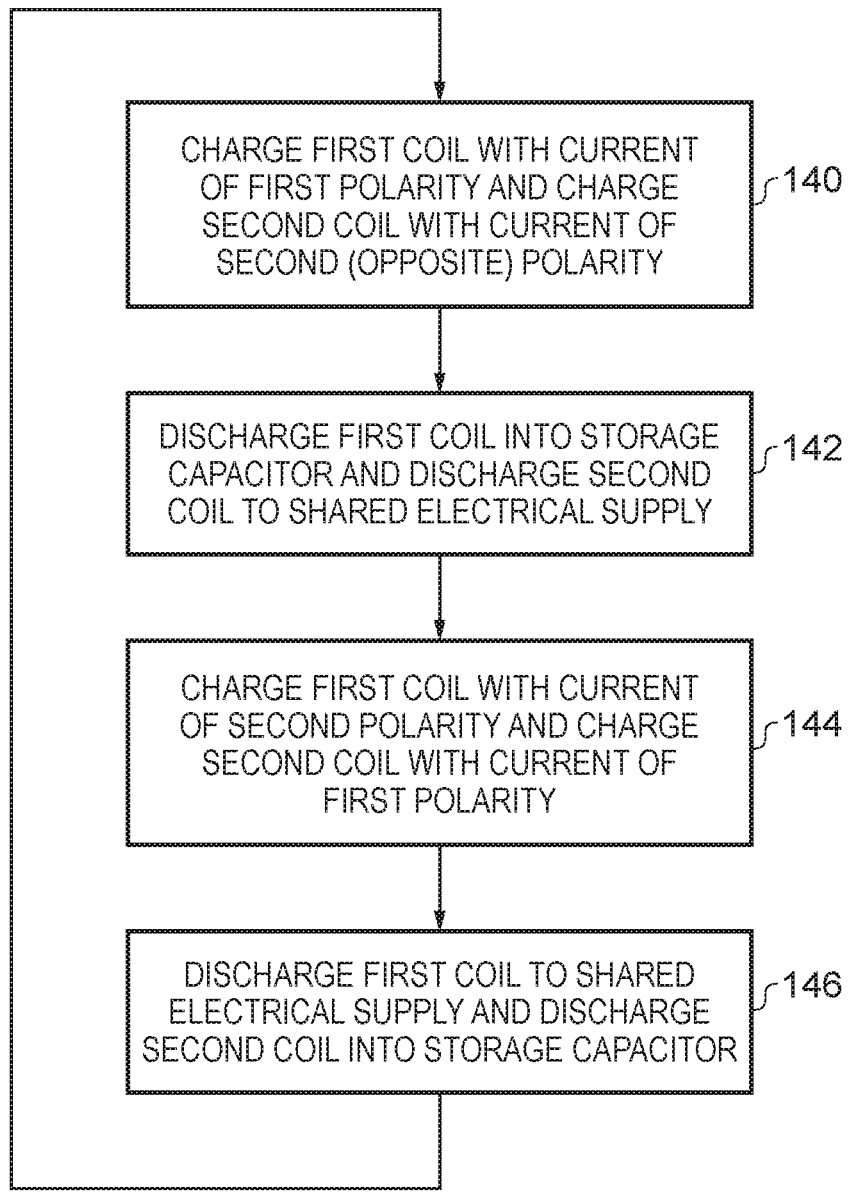
FIG. 14 schematically illustrates a sequence of steps which are taken in the method of one example.

FIG. 14 shows a sequence of steps which are taken in one example, illustrating how two driver circuits are operated. The flow can be considered to commence at step 140 where in a first phase a first stator coil of a switched reluctance electrical motor is charged by one driver circuit with current of a first polarity from a shared supply and a second stator coil is charged with current of a second (opposite) polarity from the storage capacitor of the second driver circuit. At step 142, in a second phase, both motor coils are discharged, the first stator coil being discharged into the storage capacitor of the first driver circuit and the second electrical motor coil is discharged to the shared supply. At step 144, in a third phase, both motor coils are charged again, but each in the opposite direction to the first phase. The first motor coil is charged with current of the second polarity from the storage capacitor of the first driver circuit and the second motor coil is charged with current of the first polarity from the shared supply. Finally at step 146, in a fourth phase, both motor coils are again discharged. The first motor coil is discharged to the shared supply and the second electrical motor coil is discharged into the storage capacitor of the second driver circuit.

Figure 15:
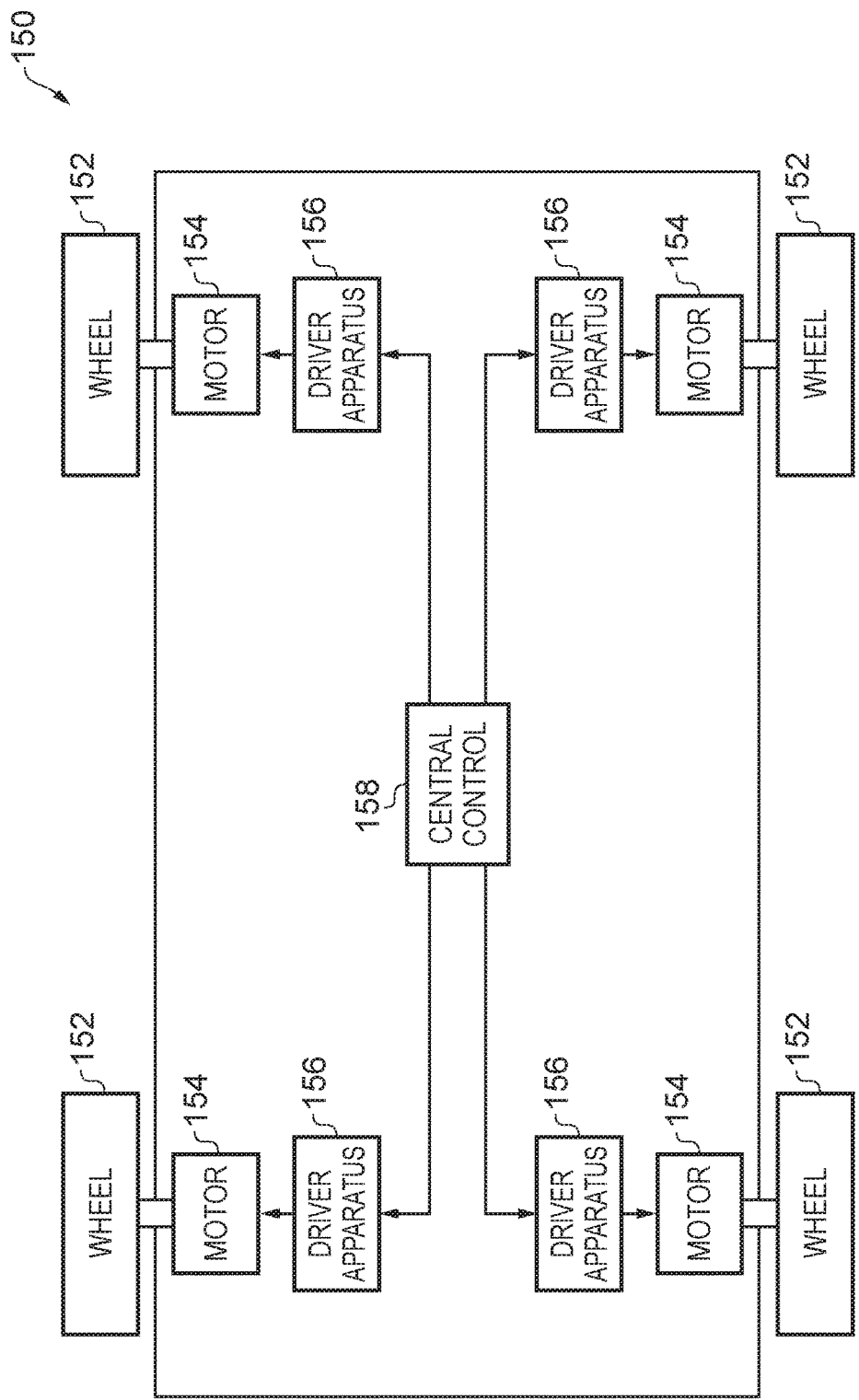
FIG. 15 schematically illustrates the motor system of one example used to power the wheels of a car.

FIG. 15 schematically illustrates an electric vehicle, say an automobile, in which an example of the electrical motor system is to be found. The vehicle 150 has four wheels 152, each driven by its own motor 154. Each motor 154 is driven by an associated driver apparatus 156, and overall control of the set of four driver apparatuses is maintained by a central control unit 158. Within each motor 154 the coil windings provided on each stator tooth are aluminium. In the context of a mobile vehicle, this is beneficial because aluminium is approximately three times lighter than copper and approximately five times cheaper (by weight), making it approximately fifteen times cheaper per area (making it cheap enough to be a replaceable wear item). In other examples the coil windings provided on each stator tooth may be copper, or any other suitably conductive metal.

Previously the choice of aluminium for the stator coil windings would have generally been rejected however, because aluminium's resistance is twice as high per cross sectional area, and because it fatigues with vibration more quickly than copper. However in an electrical motor system according to the present techniques, the current required in the coils is notably low and hence the power loss (according to $I^2R$) due to the higher resistance is of lesser significance. Indeed the higher value of R in fact makes the L/R time constant lower, and so the driver circuit operates faster.

Furthermore, the combination of the low cost of the motor and its flexibility of operation with respect to rotational speed means that it is practical in the example shown in FIG. 15 to provide an individual motor at each wheel, rather than one central motor with associated gearing and transmission. Placing such a "cheap" motor, using aluminium windings for the stator coils, at each wheel makes the motor accessible to be a replaceable item (in the manner of a brake pad, say) and the benefit of using the cheap aluminium can be realized.

It should be appreciated that such an arrangement is also possible, at least in part, due to the lessened importance of the magnetic energy transfer to the rotor from the coil here. This is due the fact that the present techniques mean that whatever magnetically stored energy that doesn't get magnetically transferred to the rotor from the coil can be recovered and reused. Where previously the air-gap between the coils and the rotor in the motor would have to be very small—e.g. a fraction of a millimeter—in order to maintain an acceptable efficiency (by good magnetic energy transfer from the rotor to the coil), this constraint on the size of the air-gap is more relaxed for the present motor system, due to the recycling of energy. In turn this means that the motor can be positioned in a much more exposed position, due to its greater tolerance for a more relaxed (and varying) air-gap.

Figure 16:
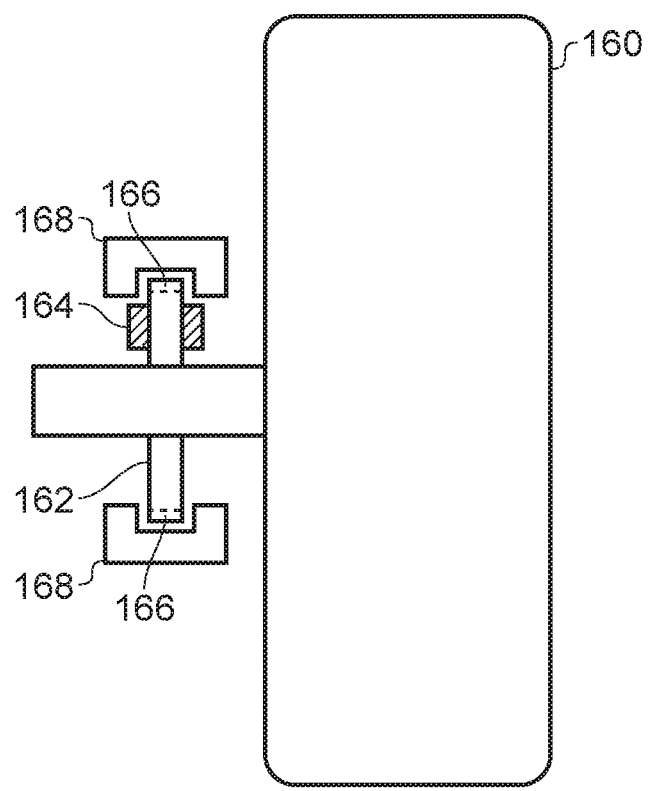
FIG. 16 schematically illustrates an example in which a motor system is provided by the adaptation of a brake disk in an automobile.

Indeed FIG. 16 illustrates an example motor example in which an automobile wheel 160 has a brake disk 162 which has been adapted to form part of the motor. Brake pads 164 continue to perform the usual braking function through selective frictional application to the brake disk 162, but the outer edge 166 of the brake disk 162 has been adapted to provide the rotor portion (e.g. with molded tins or spokes to provide variable reluctance) of the motor. A surrounding part 168 provides the stator portion. Combining an "existing" component with the motor in this manner also has clear weight reduction advantages for the vehicle as a whole. Such an adaptation could also for example be made to other components of the general wheel assembly such as the steel rim or the brake drum. Previous switched reluctance motor designs would typically be unable to tolerate operation in this kind of exposed position, due to their fine sensitivity as regards the air-gap between the coils and the rotor in the motor, for example requiring the air-gap to be less than 0.5 mm, and the exposure of a relatively expensive motor in this manner would not normally be contemplated. However the present techniques: a) provide a considerably cheaper motor system which makes its own replacement a less significant cost factor; b) allow a lower current configuration which makes its construction out of cheaper, but more resistive materials (such as aluminium) more practical; and c) recycle the energy used, thus allowing an improved efficiency and making a precise and small coil to rotor air-gap less significant, e.g. allowing the air-gap to be greater than 1.0 mm.

In conclusion, it will be appreciated from the above description that the electrical motor system and its associated coil driver circuitry described herein enables the use of strong magnetic fields in the stator coils at low net power outputs by recycling the unused energy that isn't translated into rotational energy from those fields. With this capability and further by means of being able to disable groups of the stator coils the motor can be operated efficiently down to extremely low input levels. For example, a prototype 750W (1HP) motor constructed according to the described principles has been operated across its full range of output speeds with input power levels as low as 15W, i.e. 50× lower than its design power. This capability, in addition to operating the motor at low rotational speeds (facilitated by the large number of phases and rotor teeth) allows the motor to operate efficiently at a wide variety of output levels, which may obviate the need for a gearbox and/or transmission in various systems.

Figure 17:
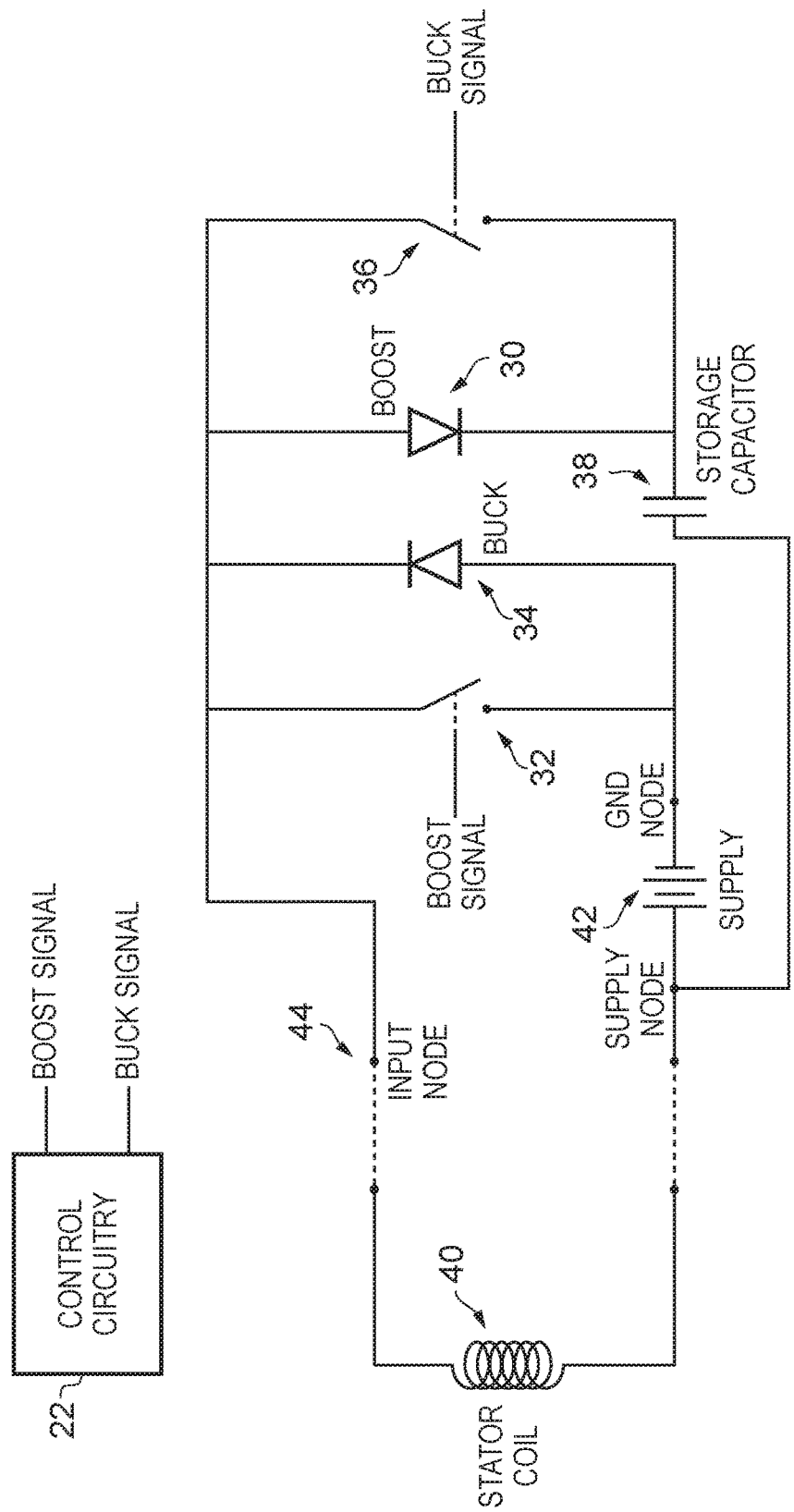
FIG. 17 schematically illustrates a coil driver circuit in one example where the charge storage element is supply-referenced.

FIG. 17 schematically illustrates the principal components of one example of the stator coil driver circuitry associated with a single stator coil, which will be recognized as a variation on the circuitry shown in FIG. 2. Indeed the components of the circuitry in FIG. 17 are the same as those shown in FIG. 2, play the same roles as the components shown in FIG. 2, and are given the same reference numerals. A repeated description of those components is therefore dispensed with here for brevity. The difference between the circuitry of FIG. 17 that of FIG. 2 is that in FIG. 17 the storage capacitor 38 is referenced to the supply node instead of the ground node. Because the stator coil 40 is attached to the supply node, not the ground node, and here the storage capacitor 38 is also attached to the supply node, not the ground node, the entire buck phase dumps charge in a tight loop between the storage capacitor 38 and the stator coil 40, and the electrical supply 42 is no longer involved. Hence when the stator coil 40 is charged from the storage capacitor 38 in the buck phase, the current no longer flows to the supply 42 and then the stator coil 40 is discharged in the buck phase, the charge flows back to the storage capacitor 38 from where it came.

This also allows for a reduction in size (and thus notably also cost) of the storage capacitor 38, since the storage capacitor 38 is always biased at the supply voltage. As mentioned above, this supply referencing of the storage capacitor 38 means that the supply does not take part in any current that involves the storage capacitor 38, since the supply is bypassed whenever the storage capacitor 38 is charging or discharging, allowing it to be reduced in size. Unlike in the case of a ground-referenced storage capacitor 38, the stator coil current does not match the supply current.

Figure 18A:
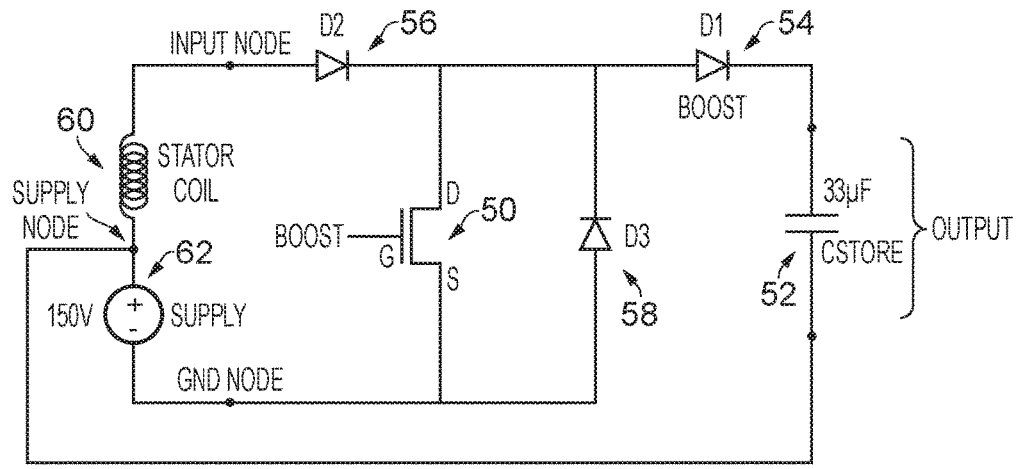
FIG. 18A schematically illustrates switched inductance boost voltage converter circuitry forming part of a driver circuit in one example where the charge storage element is supply-referenced.
Figure 18B:
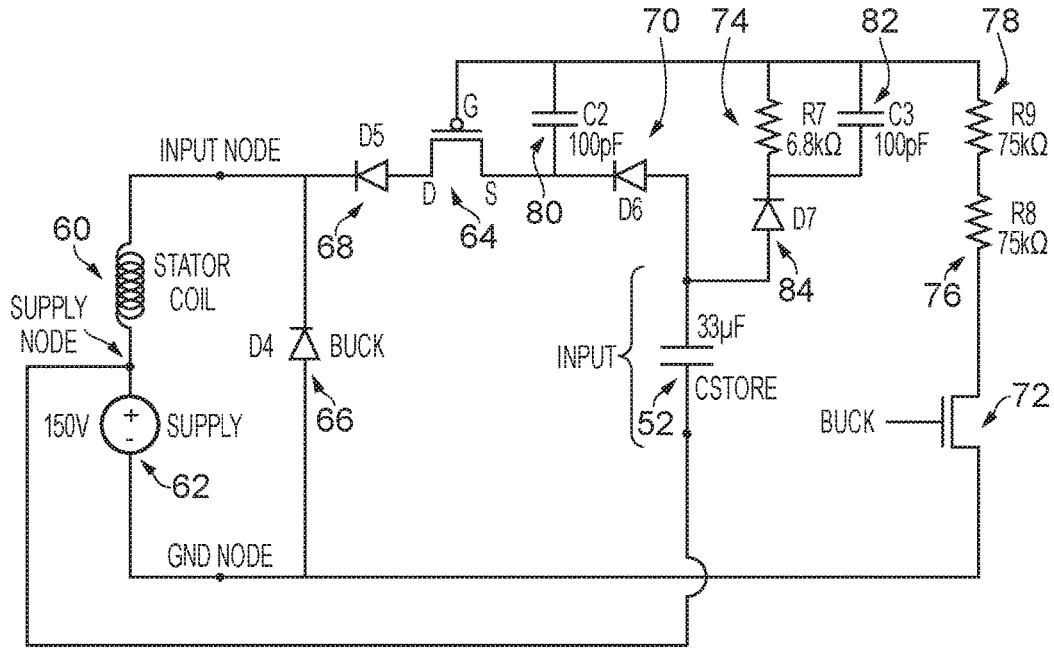
FIG. 18B schematically illustrates switched inductance buck voltage converter circuit forming part of a driver circuit in one example where the charge storage element is supply-referenced.
Figure 19:
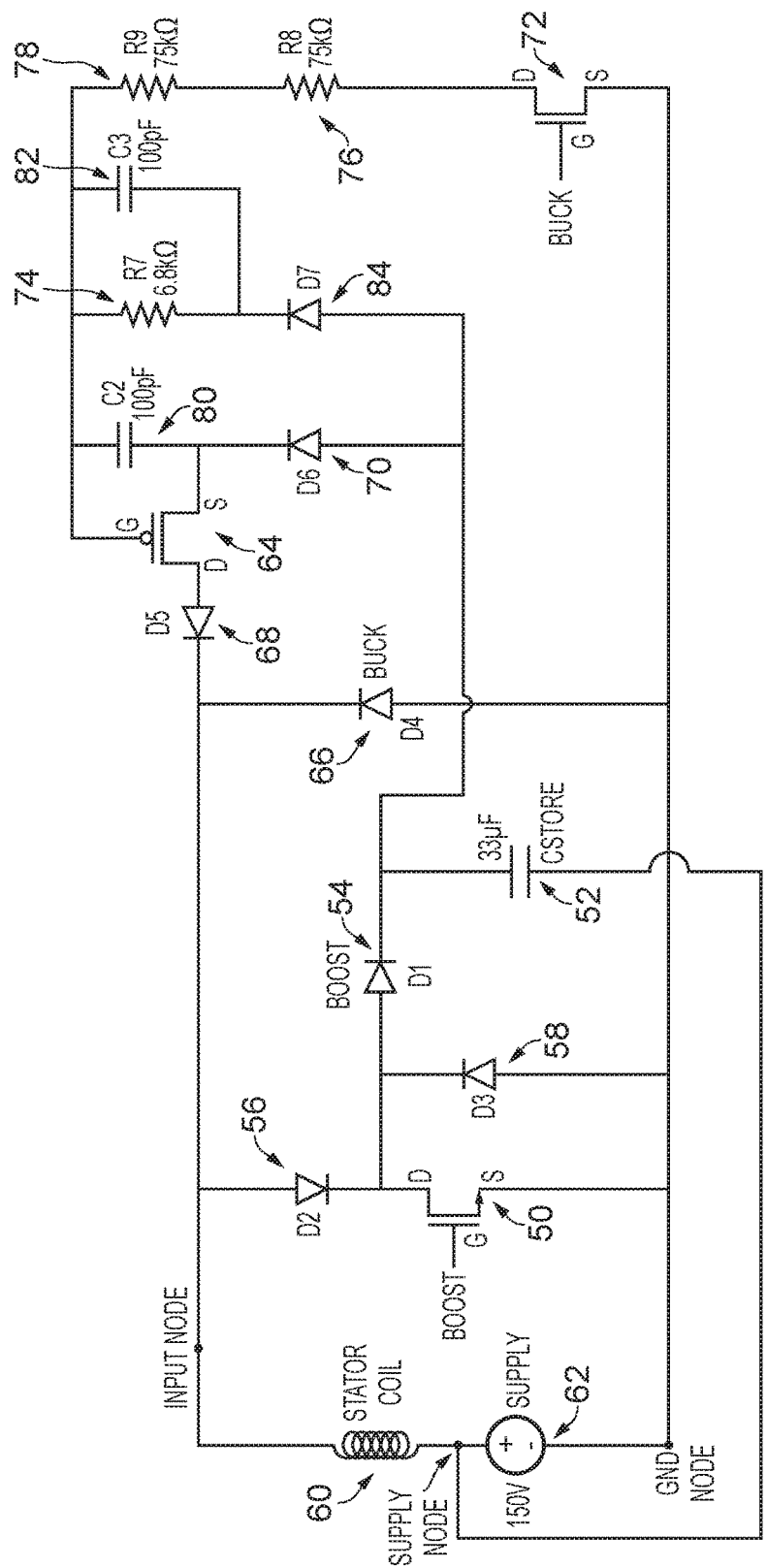
FIG. 19 schematically illustrates a driver circuit in one example where the charge storage element is supply-referenced.

FIGS. 18A, 18B, and 19 similarly illustrate the further detail of the configuration of a driver circuit in one example which in turn are the same variation on the examples of FIGS. 5A, 5B and 6 respectively, i.e. where the storage capacitor (CSTORE) 52 is supply node referenced (instead of being ground referenced as in the examples of FIGS. 5A, 5B and 6). Again the components of the circuitry in FIGS. 18A, 18B, and 19 are the same as those shown in FIGS. 5A, 5B and 6, play the same roles as the components shown in FIGS. 5A, 5B and 6, and are given the same reference numerals. A repeated description of those components is therefore dispensed with here for brevity.

Figure 20:
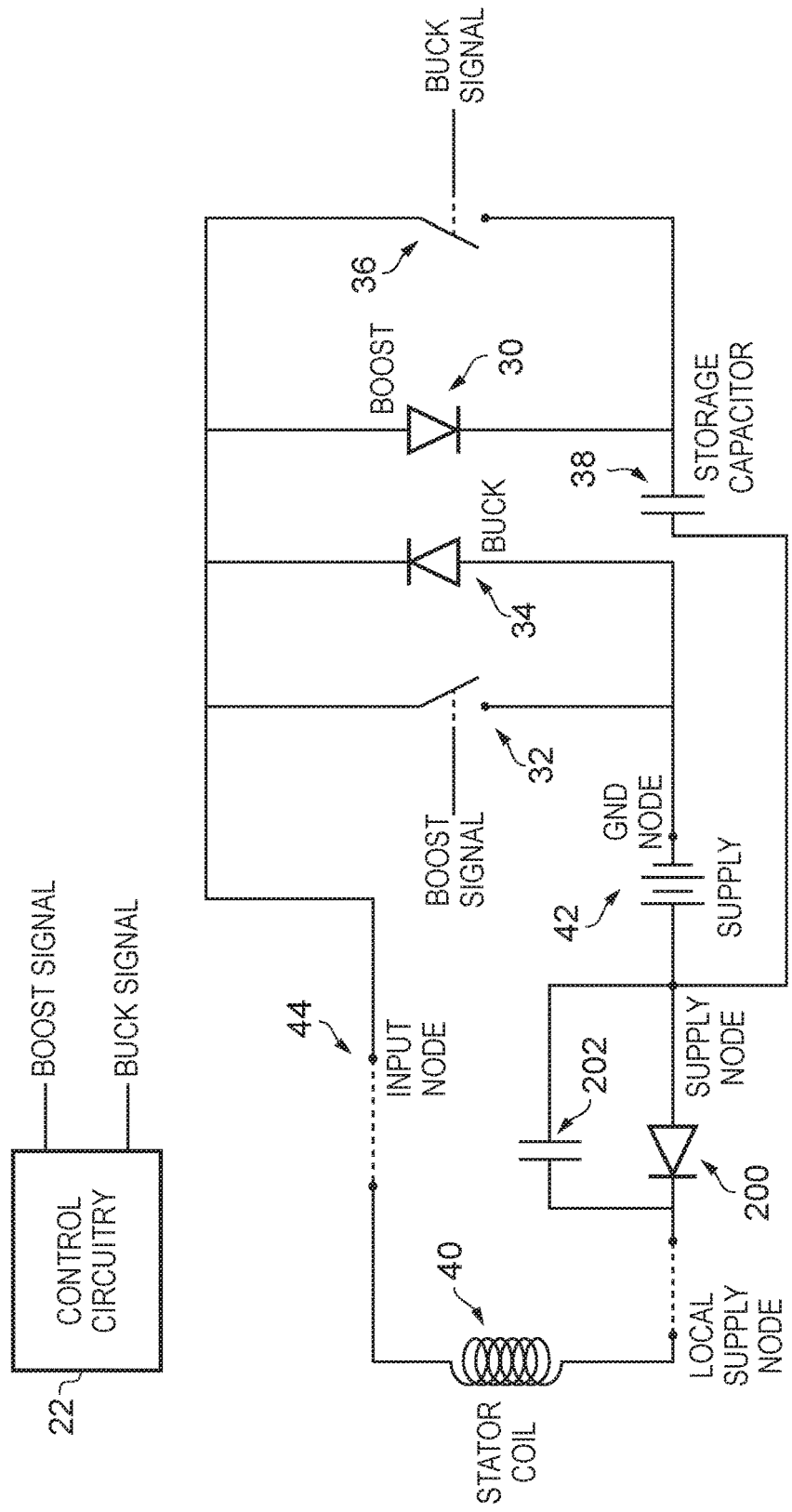
FIGS. 20 and 21 schematically illustrate a driver circuit in examples where the charge storage element is supply-referenced and an additional protective supply capacitor and supply diode are provided.
Figure 21:
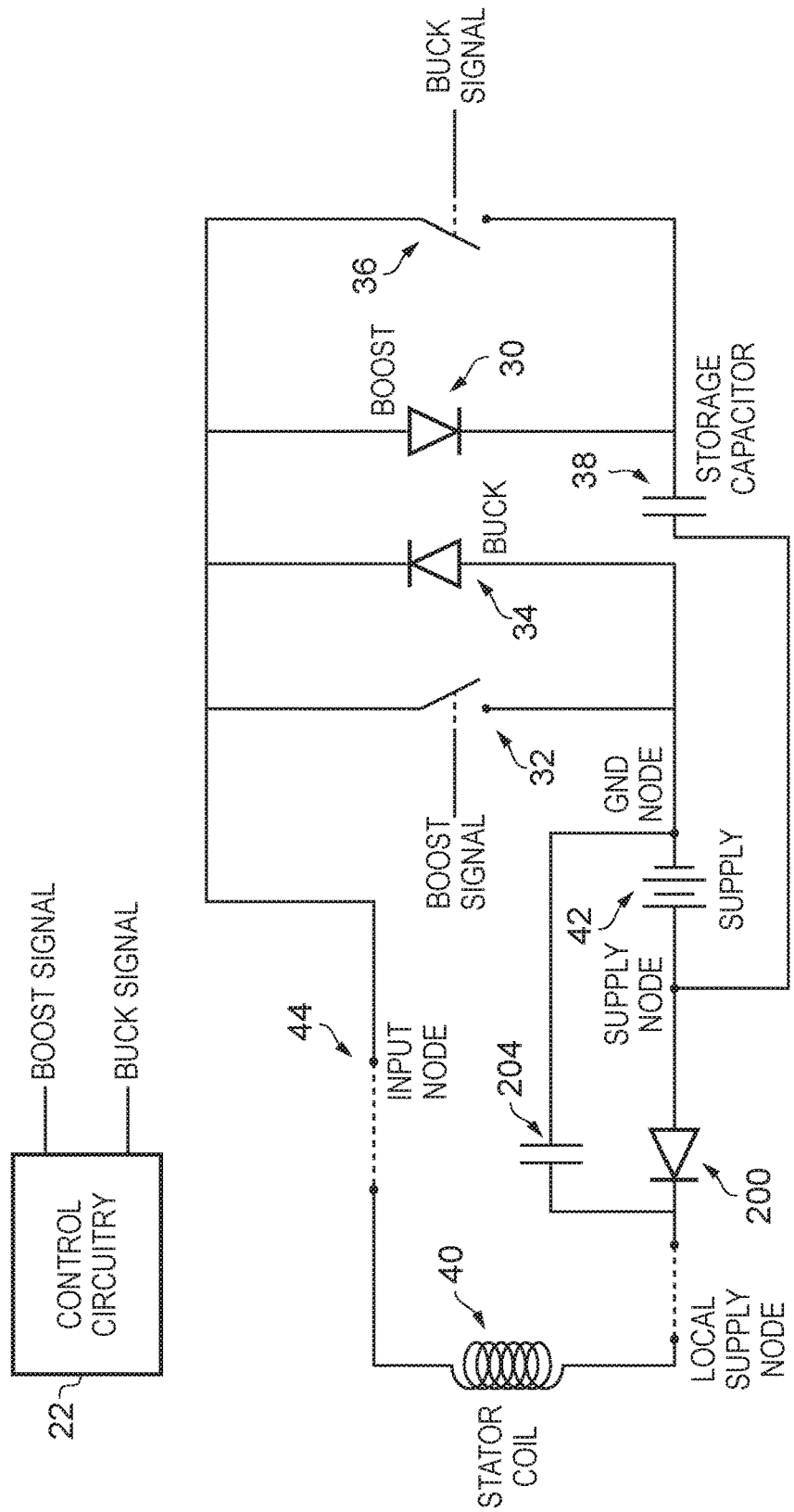

FIG. 20 shows a variation on the example of FIG. 17, where a supply diode 200 and a supply capacitor 202 are added The supply diode 200 is provided to hinder current from flowing back to the supply 42. Hence, when the driver circuit tries to drive current back to the supply 42 (which only happened on buck inductor discharge), voltage then builds up at a node "downstream" of the supply diode (also referred to herein as the "local supply" node) As the voltage at this local supply increases, some of the current will be driven back towards the storage capacitor 38, partly recharging it. Because electrical energy Which remains stored at the local supply node could result in relatively high local voltages, the circuit of FIG. 20 further comprises a supply capacitor 202 spanning the supply diode 202. This supply capacitor 202 can absorb this additional local current and reduce the level of such local supply voltages. FIG. 21 shoes a similar, alternative configuration where the supply capacitor 204 instead couples the local supply node (i.e. a terminal of the coil winding) to the ground node on the opposite side of the electrical supply to the supply node.

Figure 22:
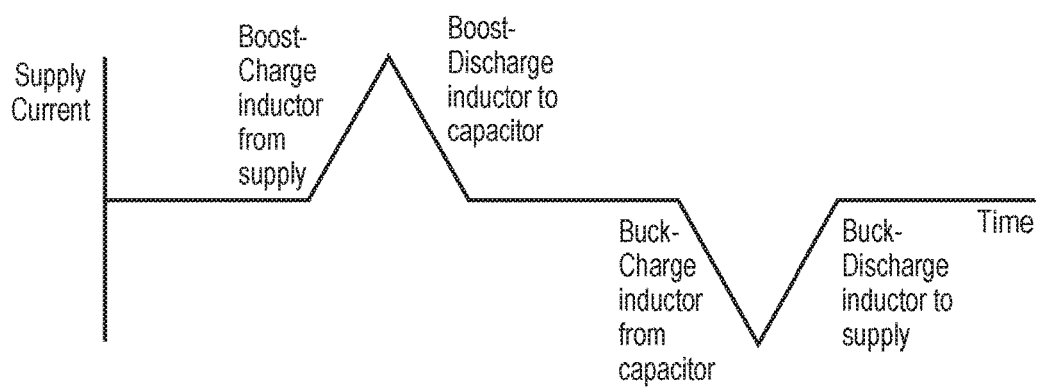
FIGS. 22 and 23 illustrate the variation in supply current with time in an example in which the charge storage element is ground-referenced.

FIGS. 22-25 discuss the variation in supply current with time in comparison between examples in which the charge storage element is ground-referenced (FIGS. 22 and 23) and examples in which the charge storage element is supply-referenced (FIGS. 24 and 25) through the respective boost and buck phases. FIG. 22 is shown with a first boost phase, in which firstly the supply coil (the inductor) is charged from the supply and then secondly the supply coil is discharged into the capacitor. This is then followed by a subsequent buck phase in which firstly the supply coil (the inductor) is charged from the capacitor and then secondly the supply coil is discharged into the supply. The inductor current can be seen to match the supply current.

Figure 23:
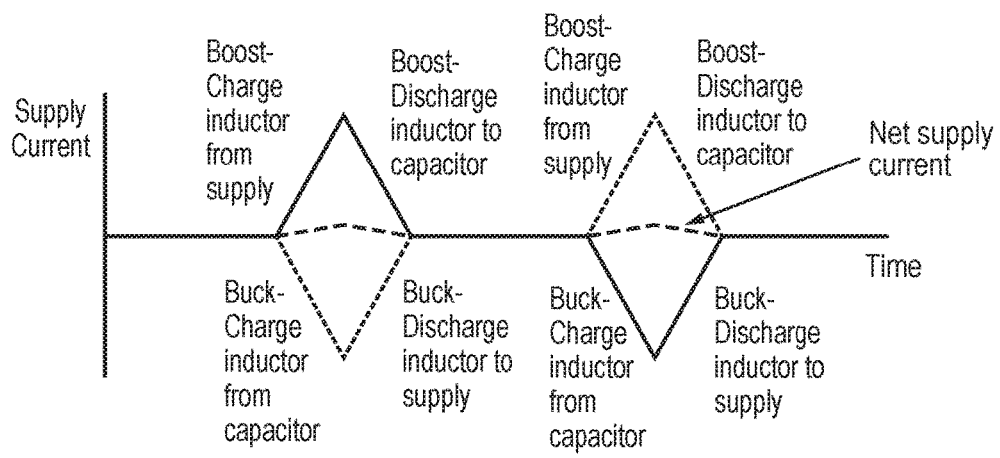

FIG. 23 shows how two coil drivers each with ground-referenced charge storage elements can be run out-of-phase with each other from a shared supply, such that the net coil driver supply current is largely cancelled out, leaving only the net motor output power as the supply draw. The full line corresponds to the current profile for a first coil driver as described above with reference to FIG. 22. The dotted line corresponds to the current profile for a second coil driver operating 180 degrees out of phase with the first coil driver. When the first coil driver is in the boost phase, the second coil driver is in the buck phase, and vice versa.

Figure 24:
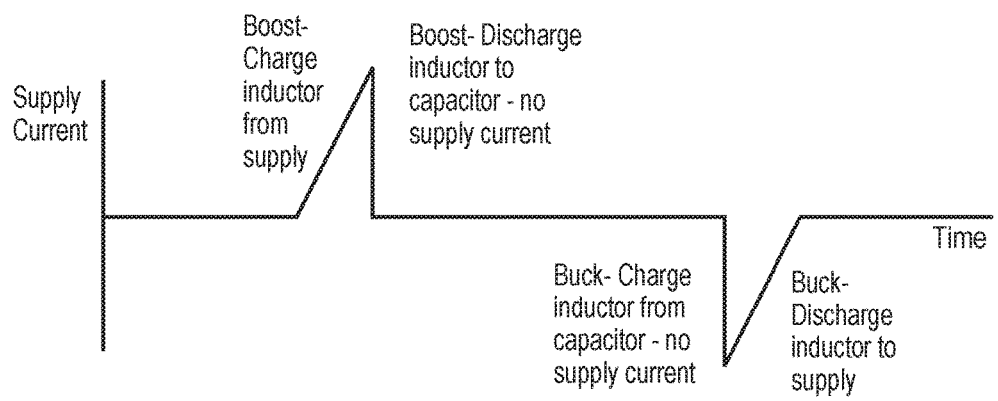
FIGS. 24 and 25 illustrate the variation in supply current with time in an example in which the charge storage element is supply-referenced.

Turning to FIG. 24, the variation in supply current with time is shown in the example of a coil driver in which the charge storage element is supply-referenced. As in the FIG. 22 example there is a first boost phase, in which firstly the supply coil (the inductor) is charged from the supply and then secondly the supply coil is discharged into the capacitor. However the supply-referencing of the capacitor means that there is no supply current when the supply coil is discharged into the capacitor and this can be seen to directly fall to zero. Conversely this is then followed by the subsequent buck phase in which firstly the supply coil (the inductor) is charged from the capacitor and then secondly the supply coil is discharged into the supply. Again, the supply-referencing of the capacitor means that there is no supply current when the supply coil is charged from the capacitor and the supply current can be seen to remain at zero. When the supply coil is finally discharged into the supply and the supply current can can be seen to rapidly peak before discharging to zero. Overall it can be seen that the supply no longer takes part in any current that involves the capacitor, the supply being bypassed whenever the capacitor is charging or discharging. Here (by contrast with FIG. 22) the inductor current no longer matches the supply current.

Figure 25:
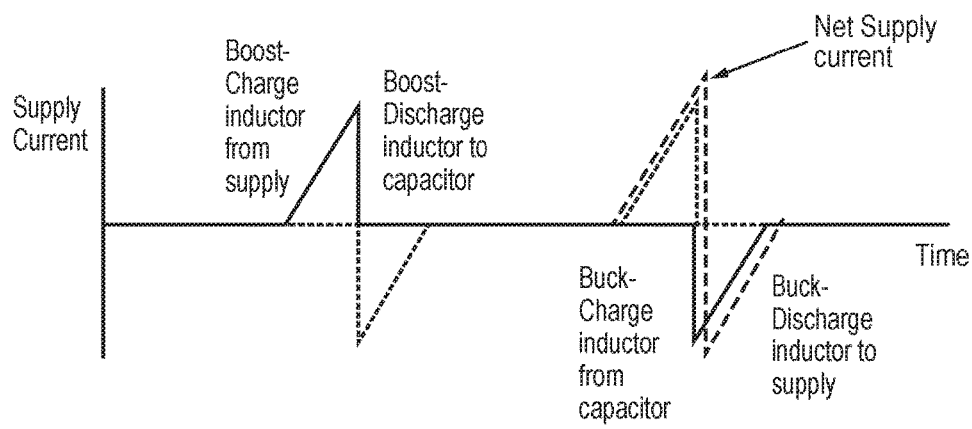

Now considering FIG. 25, it can be seen that the multi-channel cancellation of currents shown in FIG. 23 is no longer possible. FIG. 25 shows how two coil drivers each with supply-referenced charge storage elements being run out-of-phase with each other from a shared supply does not result in the net coil driver supply current being cancelled out. In essence, the wrong parts of the current flows are hidden from the supply, leading to discontinuities and the addition of the currents. The full and dotted lines represent the supply current profiles of the two coil drivers and on the right hand side, with the dashed line, the net supply current is shown. Note that a small offset of the current traces (in particular of the net supply current from the two coil driver profiles) is employed merely for clarity of illustration such that both lines can be seen. In fact the net supply current should directly overlie the other (dotted and full) lines.

Figure 26:
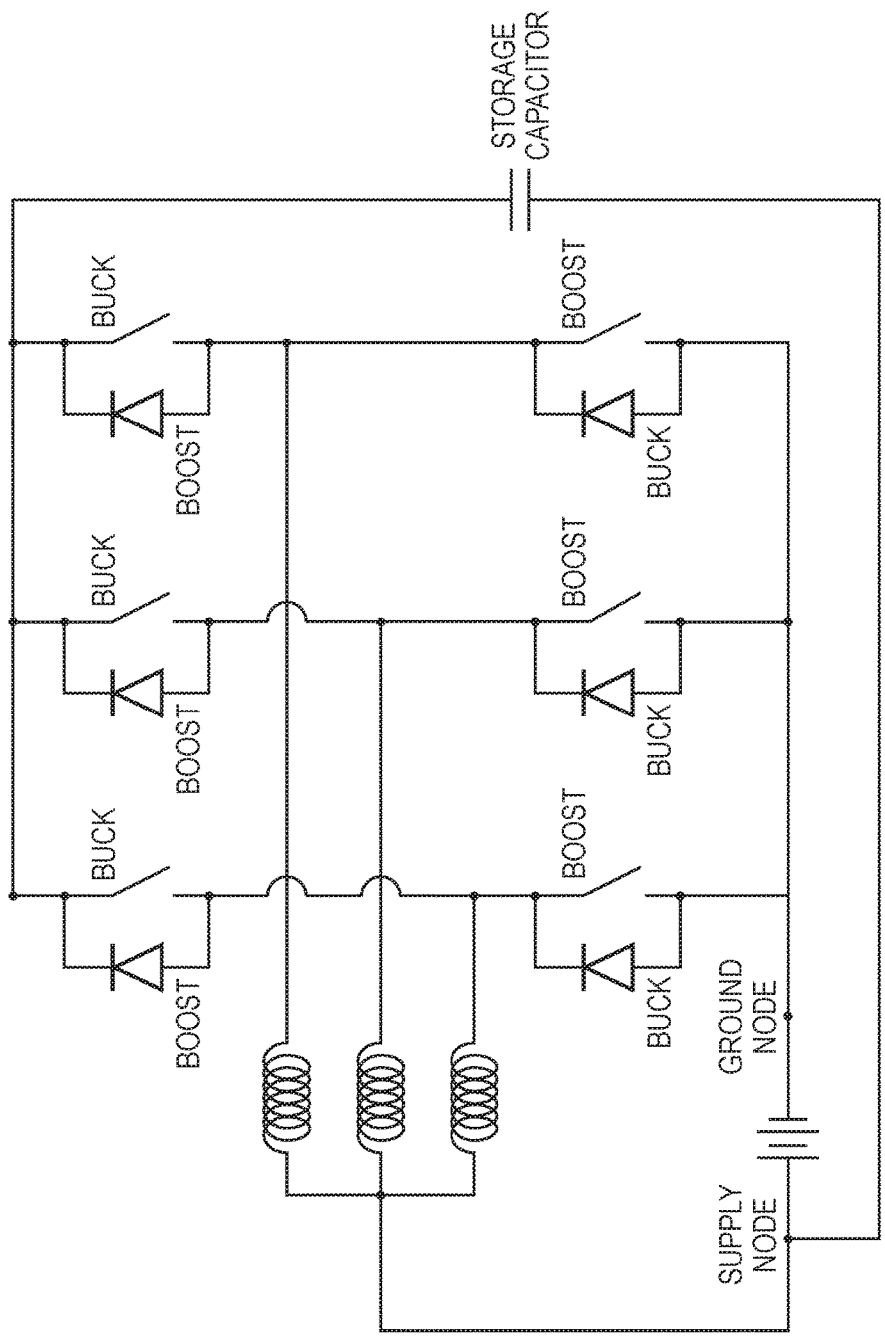
FIGS. 26 and 27 schematically illustrate two examples of three-phase arrangements, one with a shared supply-referenced storage capacitor and one with a separate storage capacitors for each phase.
Figure 27:
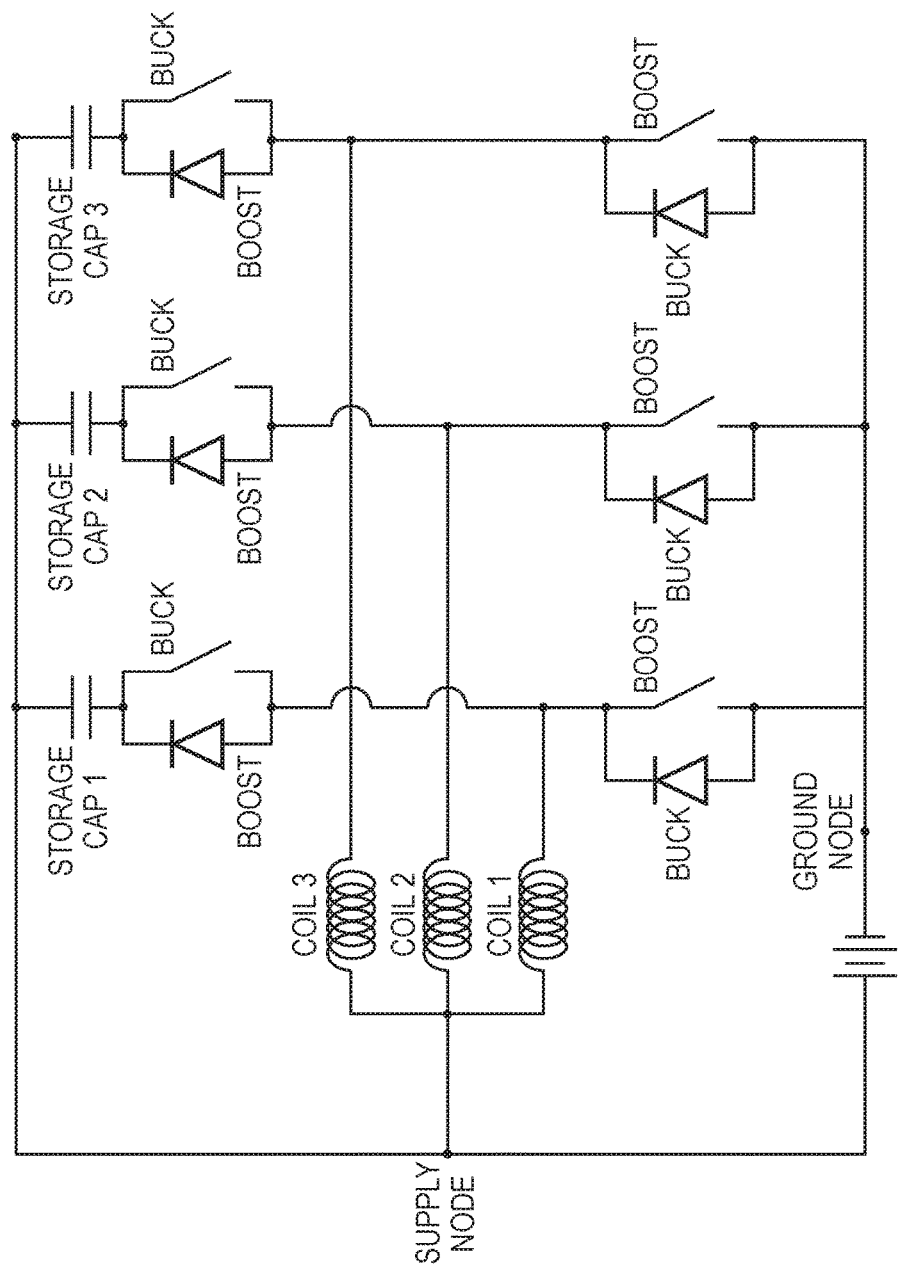

Supply referencing the storage capacitor can thus find particular applicability in arrangements where paired multi-phase supply current cancelling is of lesser concern, such as in the example of a three-phase system, as here it can directly reduce currents by half with a bidirectional supply (as well as reduce the costs for the storage capacitors) when compared to the traditional ground referenced storage capacitor. For a unidirectional supply the currents are further reduced, but the capacitor cost is not, due to the need for the additional supply capacitor on the "local supply" (as discussed above). FIGS. 26 and 27 show two examples of three-phase configuration. FIG. 26 shows a shared supply-referenced storage capacitor, whilst FIG. 27 shows a separate storage capacitors for each phase, where each is reference to the same supply node.

Although illustrative examples of the invention have been described in detail herein with reference to the accompanying drawings, it is to be understood that the invention is not limited to those precise examples, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. Apparatus comprising:
an electrical motor comprising a rotor and a stator, the rotor comprising a plurality of rotor teeth and the stator comprising a plurality of stator teeth, and
a driver circuit to drive the electrical motor comprising:
a boost converter comprising a charge storage element and coupled to a first terminal of a coil winding on at least one of the plurality of stator teeth; and
a buck converter comprising said charge storage element and coupled to said first terminal of the coil winding on the at least one of the plurality of stator teeth,
wherein an inductive element of the boost converter and the buck converter is provided by said coil winding of the at least one of the plurality of stator teeth,
and wherein the charge storage element is referenced to a supply node for coupling the second terminal of the coil winding to an electrical supply.

2. The apparatus of claim 1, further comprising a supply diode coupling in a. forward direction the supply node to the second terminal of the coil winding.

3. The apparatus of claim 2, further comprising a supply capacitor spanning the supply diode.

4. The apparatus of claim 2, further comprising a supply capacitor coupling the second terminal of the coil winding to a ground node on an opposite side of the electrical supply to the supply node.

5. The apparatus of claim I wherein the electrical supply is a bidirectional electrical supply.

6. The apparatus of claim 2, wherein the electrical supply is a unidirectional electrical supply.

7. The apparatus of claim 1, comprising two further driver circuits to drive the electrical motor, wherein the driver circuit and the two further driver circuits are coupled to three independent coil windings of the electrical motor, wherein the driver circuit and the two further driver circuits share the electrical supply, and wherein the driver circuit and the two further driver circuits are arranged to operate in a three-phase arrangement with respect to one another.

8. The apparatus of claim 1, wherein the boost converter further comprises:
a diode coupled to the coil winding and a first electrode of the charge storage element; and
a switch arranged to connect the coil winding to a ground node on an opposite side of the electrical supply to the supply node.

9. The apparatus of claim 8, wherein the buck converter further comprises:
a diode coupled to the coil winding and the ground node on the opposite side of the electrical supply to the supply node; and
a switch arranged to connect the coil winding to the first electrode of the charge storage element in dependence on a buck signal.

10. The apparatus of claim 9, further comprising a controller to provide the boost signal and the buck signal and to begin assertion of either the boost signal or the buck signal when a current flow in the coil winding is substantially zero.

11. The apparatus of claim 10, wherein the controller is configured to assert the boost signal and buck signal in mutual exclusion.

12. The apparatus of claim 10, wherein the controller is configured to assert the boost signal and the buck signal as a continuous pulse.

13. The apparatus of claim 8, further comprising a first boost diode coupling in a forward direction the coil winding to the switch of the boost convertor.

14. The apparatus of claim 9, further comprising a first buck diode coupling in a forward direction the switch of the buck convertor to the coil winding.

15. The apparatus of claim 9, wherein the buck converter further comprises reference circuitry to reference the buck signal to the ground node and to provide at a gate of the switch a gate voltage referenced to a voltage at the first electrode of the charge storage element.

16. The apparatus of claim 15, wherein the reference circuitry comprises a voltage divider to provide first and second resistive paths to the gate of the buck switch; and
wherein the first resistive path couples the first electrode of the charge storage element to the gate of the buck switch and the second resistive path couples the gate of the buck switch to the ground node in dependence on the buck signal.

17. A motor driver circuit for driving a coil winding of an electrical motor comprising:
   a boost converter comprising a charge storage element and an input node arranged to be coupled to a first terminal of a coil winding of an electrical motor; and
   a buck converter comprising said charge storage element and said input node,
   wherein an inductance of the boost converter and the buck converter is provided when the input node is coupled to the coil winding of the electrical motor,
   wherein an output of the boost converter is a voltage developed across the charge storage element and an input of the buck converter is the voltage developed across the charge storage element,
   and wherein the charge storage element is referenced to a supply node, wherein the supply node is arranged to couple the second terminal of the coil winding to an electrical supply.

18. A method of operating a driver circuit to drive an electrical motor comprising:
   switching a boost converter comprising a charge storage element and coupled to a first terminal of a coil winding on at least one of the plurality of stator teeth of the electrical motor to connect the first terminal of the coil winding to a ground node of an electrical supply, wherein a supply node of the electrical supply is coupled to a second terminal of the coil winding;
   switching a buck converter comprising said charge storage element and coupled to said first terminal of the coil winding to connect the first terminal of the coil winding to the charge storage element, wherein an inductive element of the boost converter and the buck converter is provided by said coil winding of the at least one of the plurality of stator teeth;
   and referencing the charge storage element to the supply node.

* * * * *